United States Patent
Shinoda et al.

(10) Patent No.: US 11,192,507 B2
(45) Date of Patent: Dec. 7, 2021

(54) ELECTRONIC CONTROL DEVICE, IN-VEHICLE SYSTEM, AND POWER SUPPLY DEVICE

(71) Applicant: Hitachi Automotive Systems, Ltd., Hitachinaka (JP)

(72) Inventors: Hiroshi Shinoda, Tokyo (JP); Tomohiko Yano, Tokyo (JP); Hideyuki Sakamoto, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 142 days.

(21) Appl. No.: 16/610,542

(22) PCT Filed: Apr. 19, 2018

(86) PCT No.: PCT/JP2018/016094
§ 371 (c)(1),
(2) Date: Nov. 4, 2019

(87) PCT Pub. No.: WO2018/230149
PCT Pub. Date: Dec. 20, 2018

(65) Prior Publication Data
US 2020/0055467 A1 Feb. 20, 2020

(30) Foreign Application Priority Data
Jun. 12, 2017 (JP) .............................. JP2017-115348

(51) Int. Cl.
*B60R 16/02* (2006.01)
*G06F 1/26* (2006.01)
(Continued)

(52) U.S. Cl.
CPC ................ *B60R 16/02* (2013.01); *G06F 1/26* (2013.01); *H02J 9/005* (2013.01); *H02M 3/155* (2013.01)

(58) Field of Classification Search
CPC ............ B60R 16/02; G06F 1/26; H02J 9/005; H02M 3/157; H02M 3/158; H02M 2003/1566; H02M 3/155
(Continued)

(56) References Cited

U.S. PATENT DOCUMENTS

| 9,537,402 B2 | 1/2017 | Kurauchi et al. |
| 2006/0150174 A1 | 7/2006 | Abe et al. |

(Continued)

FOREIGN PATENT DOCUMENTS

| JP | 2000-81991 A | 3/2000 |
| JP | 2004-274727 A | 9/2004 |

(Continued)

OTHER PUBLICATIONS

Japanese-language Office Action issued in Japanese Application No. 2017-115348 dated Apr. 6, 2021 with English translation (eight (8) pages).

(Continued)

*Primary Examiner* — Toan T Vu
(74) *Attorney, Agent, or Firm* — Crowell & Moring LLP

(57) ABSTRACT

A transient increase or decrease of power supplied to a reconfiguration circuit to be a logic circuit whose circuit configuration can be changed is reduced. An autonomous traveling control ECU 201 has a reconfiguration circuit 209, a main power supply circuit 211, an auxiliary current source (Continued)

circuit 213, and a function control unit 207. The reconfiguration circuit 209 is a reconfigurable logic circuit. The main power supply circuit 211 supplies a power supply voltage to the reconfiguration circuit 209. The auxiliary current source circuit 213 increases or decreases a current supplied from the main power supply circuit 211 to the reconfiguration circuit 209. The function control unit 207 determines an operation mode of the reconfiguration circuit 209 on the basis of a mode determination signal input from the outside and indicating a traveling mode of a vehicle, and controls a reconfiguration of the reconfiguration circuit 209 on the basis of a determination result. The auxiliary current source circuit 213 increases or decreases the current supplied to the reconfiguration circuit 209 in accordance with a load variation of the reconfiguration circuit 209, on the basis of an auxiliary current control signal for giving an instruction on an increase or decrease of the current supplied to the reconfiguration circuit 209.

12 Claims, 15 Drawing Sheets

(51) Int. Cl.
*H02J 9/00* (2006.01)
*H02M 3/155* (2006.01)

(58) Field of Classification Search
USPC .................................................. 307/9.1, 10.1
See application file for complete search history.

(56) References Cited

U.S. PATENT DOCUMENTS

| 2007/0115026 | A1 | 5/2007 | Krishnan et al. |
| 2015/0333636 | A1* | 11/2015 | Kurauchi ............... H02J 1/102 |
| | | | 363/17 |
| 2018/0113757 | A1 | 4/2018 | Sakata et al. |
| 2018/0278254 | A1 | 9/2018 | Sakata et al. |

FOREIGN PATENT DOCUMENTS

| JP | 2004-335688 | A | | 11/2004 |
| JP | 2006-155176 | A | | 6/2006 |
| JP | 2006155176 | | * | 6/2006 |
| JP | 2007-517460 | A | | 6/2007 |
| JP | 2007-293542 | A | | 11/2007 |
| JP | 2008-263261 | A | | 10/2008 |
| JP | 2011-150637 | A | | 8/2011 |
| JP | 2013-228406 | A | | 11/2013 |
| JP | 2015-191298 | A | | 11/2015 |
| JP | 2015-220775 | A | | 12/2015 |
| WO | WO 2016/121015 | A1 | | 8/2016 |
| WO | WO 2016/207933 | A1 | | 12/2016 |

OTHER PUBLICATIONS

International Search Report (PCT/ISA/210) Issued in PCT Application No. PCT/JP2018/016094 dated May 22, 2018 with English translation (five pages).
Japanese-language Written Opinion (PCT/ISA/237) issued in PCT Application No. PCT/JP2018/016094 dated May 22, 2018 (three pages).

* cited by examiner

FIG. 3

| MODE SELECTION CONDITION | OPERATION MODE |
|---|---|
| SENSOR PARAMETER: EXPRESSWAY ENTRANCE | MODE 1 |
| AUTOMATIC OPERATION BUTTON: PARKING | MODE 2 |
| FAILURE DETECTION: ECU ABNORMALITY | MODE 3 |
| ⋮ | ⋮ |

| OPERATION MODE | PROCESSING METHOD | PROCESSING INFORMATION 1 | PROCESSING INFORMATION 2 | PROCESSING INFORMATION 3 |
|---|---|---|---|---|
| MODE 1 | SEQUENTIALLY EXECUTE RESPECTIVE PROCESSING OF PROCESSING INFORMATION 1, PROCESSING INFORMATION 2, AND PROCESSING INFORMATION 3 ON ONE CIRCUIT REGION | CIRCUIT: A1 TIME: T11 | CIRCUIT: A2 TIME: T12 | CIRCUIT: A3 TIME: T13 |
| MODE 2 | DIVIDE CIRCUIT REGION INTO TWO PARTS, SEQUENTIALLY EXECUTE PROCESSING OF PROCESSING INFORMATION 1 AND PROCESSING INFORMATION 2 IN ONE REGION, AND EXECUTE PROCESSING OF PROCESSING INFORMATION 3 IN OTHER REGION | CIRCUIT: B1 TIME: T21 | CIRCUIT: B2 TIME: T22 | CIRCUIT: B3 TIME: T23 |
| MODE 3 | DIVIDE CIRCUIT REGION INTO THREE PARTS AND EXECUTE RESPECTIVE PROCESSING OF PROCESSING INFORMATION 1, PROCESSING INFORMATION 2, AND PROCESSING INFORMATION 3 IN PARALLEL | CIRCUIT: C1 TIME: T31 | CIRCUIT: C2 TIME: T32 | CIRCUIT: C3 TIME: T33 |
| .... | .... | .... | .... | .... |

FIG. 5

| OPERATION MODE | AUXILIARY CURRENT CONTROL INFORMATION 0 | AUXILIARY CURRENT CONTROL INFORMATION 1 | AUXILIARY CURRENT CONTROL INFORMATION 2 | AUXILIARY CURRENT CONTROL INFORMATION 3 | AUXILIARY CURRENT CONTROL INFORMATION 4 | AUXILIARY CURRENT CONTROL INFORMATION 5 | AUXILIARY CURRENT CONTROL INFORMATION 6 |
|---|---|---|---|---|---|---|---|
| MODE 1 | (IF RECONFIGURATION) I10(t) ts10≤t≤te10 | (A1 RECONFIGURATION) I11(t) ts11≤t≤te11 | (FIRST PROCESSING) I12(t) ts12≤t≤te12 | (A2 RECONFIGURATION) I13(t) ts13≤t≤te13 | (SECOND PROCESSING) I14(t) ts14≤t≤te14 | (A3 RECONFIGURATION) I15(t) ts15≤t≤te15 | (THIRD PROCESSING) I16(t) ts16≤t≤te16 |
| MODE 2 | I20(t) ts20≤t≤te20 | I21(t) ts21≤t≤te21 | I22(t) ts22≤t≤te22 | I23(t) ts23≤t≤te23 | I24(t) ts24≤t≤te24 | I25(t) ts25≤t≤te25 | I26(t) ts26≤t≤te26 |
| MODE 3 | I30(t) ts30≤t≤te30 | I31(t) ts31≤t≤te31 | I32(t) ts32≤t≤te32 | I33(t) ts33≤t≤te33 | I34(t) ts34≤t≤te34 | I35(t) ts35≤t≤te35 | I36(t) ts36≤t≤te36 |
| .... | .... | .... | .... | .... | .... | .... | .... |

501 — 503-0, 503-1, 503-2, 503-3, 503-4, 503-5, 503-6

212

IMN(t): AMOUNT OF CURRENT INJECTED (EXTRACTED) AT INTERNAL TIMER VALUE t, AS CONTROL INFORMATION IN OPERATION MODE M AND INTERNAL CONTROL ID N OF AUXILIARY CURRENT

FIG. 13

| OPERATION MODE | CONTROL INFORMATION 0 | CONTROL INFORMATION 1 | CONTROL INFORMATION 2 | CONTROL INFORMATION 3 | CONTROL INFORMATION 4 | CONTROL INFORMATION 5 | CONTROL INFORMATION 6 |
|---|---|---|---|---|---|---|---|
| MODE 1 | (IF RECONFIGURATION) SW10(SN, t) ts10≤t≤te10 | (A1 RECONFIGURATION) SW11(SN, t) ts11≤t≤te11 | (FIRST PROCESSING) SW12(SN, t) ts12≤t≤te12 | (A2 RECONFIGURATION) SW13(SN, t) ts13≤t≤te13 | (SECOND PROCESSING) SW14(SN, t) ts14≤t≤te14 | (A3 RECONFIGURATION) SW15(SN, t) ts15≤t≤te15 | (THIRD PROCESSING) SW16(SN, t) ts16≤t≤te16 |
| MODE 2 | SW20(SN, t) ts20≤t≤te20 | SW21(SN, t) ts21≤t≤te21 | SW22(SN, t) ts22≤t≤te22 | SW23(SN, t) ts23≤t≤te23 | SW24(SN, t) ts24≤t≤te24 | SW25(SN, t) ts25≤t≤te25 | SW26(SN, t) ts26≤t≤te26 |
| MODE 3 | SW30(SN, t) ts30≤t≤te30 | SW31(SN, t) ts31≤t≤te31 | SW32(SN, t) ts32≤t≤te32 | SW33(SN, t) ts33≤t≤te33 | SW34(SN, t) ts34≤t≤te34 | SW35(SN, t) ts35≤t≤te35 | SW36(SN, t) ts36≤t≤te36 |
| .... | .... | .... | .... | .... | .... | .... | .... |

511 / 513-0 / 513-1 / 513-2 / 513-3 / 513-4 / 513-5 / 513-6

262

SWMN (SN, t) : ON/OFF STATE OF SWITCH ID SN AT INTERNAL TIMER VALUE t, AS CONTROL INFORMATION IN OPERATION MODE M AND INTERNAL CONTROL ID N OF AUXILIARY CURRENT

ELECTRONIC CONTROL DEVICE, IN-VEHICLE SYSTEM, AND POWER SUPPLY DEVICE

TECHNICAL FIELD

The present invention relates to an electronic control device, an in-vehicle system, and a power supply device, and particularly to technology effective for controlling a power supply that supplies power to a logic circuit whose circuit configuration can be changed.

BACKGROUND ART

Automatic driving is a system that can solve various social problems including reducing the number of accidents and resolving congestion and efforts towards commercialization thereof become active every year worldwide. In the automatic driving system, it is necessary to detect a vehicle, a pedestrian, a white line, and the like from a sensor input of a camera, a radar, and the like and transmit them to a driver or control a brake and a steering. Therefore, simultaneous processing of advanced recognition algorithms or a plurality of algorithms is required.

In order to respond to this demand, improving the performance of the automatic driving system by using a field-programmable gate array (FPGA) in addition to a CPU is under examination.

The FPGA is a reconfiguration circuit capable of changing a logic circuit, and has a feature that processing provided in a plurality of pieces of hardware can be performed on one circuit. Of course, the present invention is not limited to the above logic circuit and a whole electronic circuit is used only when power is supplied from a power supply circuit.

Meanwhile, in an electronic apparatus such as a portable computer, by adopting a power management scheme in a predetermined operation mode and appropriately switching a function of a selected assembly in the electronic apparatus to invalidity or validity, consumption is reduced.

If the function of the assembly of the electronic apparatus is validated or invalidated, a load of the electronic apparatus changes, an output voltage from a power supply device transiently decreases and increases, and a data error, an automatic reset, or the like can be caused.

As technology for reducing the transient voltage variation, for example, there is technology for providing a compensation circuit that supplies power to an electronic circuit from a path different from a path of a main power supply device (for example, see PTL 1). A control pattern for switching a switch in the compensation circuit is generated according to data input to the electronic circuit, thereby injecting a compensation current into the electronic circuit by intermittently operating the switch.

Further, as technology for smoothing an output voltage of the power supply circuit, technology for providing an output capacitor between an output terminal and a ground terminal is widely known.

CITATION LIST

Patent Literature

PTL 1: JP 2013-228406 A

SUMMARY OF INVENTION

Technical Problem

In the automatic driving system, it is necessary to respond instantaneously to unexpected situations such as jumping of the pedestrian. Therefore, it is necessary to execute reconfiguration processing of the logic circuit in a short time. When the reconfiguration processing transits to algorithm processing, a load current of the logic circuit greatly increases in a short time.

In contrast, when the algorithm processing transits to the reconfiguration processing, the load current of the logic circuit greatly decreases in a short time. Further, in the power supply circuit with the FPGA as the load, the output voltage transiently decreases and increases according to the rapid increase and decrease in the load current.

In this case, if the output voltage of the power supply circuit is out of an allowable range of the FPGA, the possibility of causing the data error or the automatic reset increases. Therefore, the power supply circuit that supplies a current to the FPGA is required to have a function of supplying a constant voltage at all times even if the rapid load variation occurs.

In PTL 1, since the load state of the electronic circuit is estimated from the input data controlling the electronic circuit, that is, changing the load state of the electronic circuit and the control pattern of the switch is generated, the control of the power supply circuit should be performed after the load variation. As a result, it is considered that it is difficult to sufficiently suppress the transient voltage variation. Further, when the electronic circuit is the reconfiguration circuit such as the FPGA, it is assumed that the electronic circuit, that is, the logic circuit is appropriately rewritten, and it is considered that it is difficult to grasp the load state of the electronic circuit only with the input data.

Further, for the output capacitor to be used for smoothing the output voltage of the power supply circuit, if the load increase of the logic circuit becomes rapid, a capacitor having a larger capacity is required and a cost or a mounting area may increase.

An object of the present invention is to provide technology capable of reducing a transient increase or decrease in power supplied to a logic circuit whose circuit configuration can be changed.

The above and other objects and novel features of the present invention will become apparent from the description of the present specification and the accompanying drawings.

Solution to Problem

An outline of a representative invention of the inventions disclosed in the present application is simply described as follows.

That is, a representative electronic control device has a reconfiguration circuit, a main power supply circuit, an auxiliary current source circuit, and a function control unit. The reconfiguration circuit is a reconfigurable logic circuit. The main power supply circuit supplies a power supply voltage to the reconfiguration circuit.

The auxiliary current source circuit controls a current supplied from the main power supply circuit to the reconfiguration circuit. The function control unit determines an operation mode of the reconfiguration circuit on the basis of a mode determination signal input from the outside and indicating a traveling mode of a vehicle, and controls a reconfiguration of the reconfiguration circuit on the basis of a determination result.

The auxiliary current source circuit increases or decreases the current supplied to the reconfiguration circuit in accordance with a load variation of the reconfiguration circuit, on the basis of an auxiliary current control signal for giving an instruction on an increase or decrease of the current supplied to the reconfiguration circuit.

ADVANTAGEOUS EFFECTS OF INVENTION

Effects obtained by a representative invention of the inventions disclosed in the present application are simply described as follows.

(1) A transient increase or decrease of an output voltage of a power supply circuit that supplies power to a reconfiguration circuit to be a logic circuit whose circuit configuration can be changed can be reduced.

(2) By the above (1), an electronic control device with high reliability can be realized.

BRIEF DESCRIPTION OF DRAWINGS

FIG. 3 is a diagram illustrating a mode database included in an autonomous traveling control logic unit of FIG. 2.

FIG. 4 is a diagram illustrating a processing item database included in the autonomous traveling control logic unit of FIG. 2.

FIG. 5 is a diagram illustrating an auxiliary current control database included in the autonomous traveling control logic unit of FIG. 2.

FIG. 13 is a diagram illustrating an example of an auxiliary current control database included in the autonomous traveling control ECU of FIG. 10.

DESCRIPTION OF EMBODIMENTS

Figure 1:
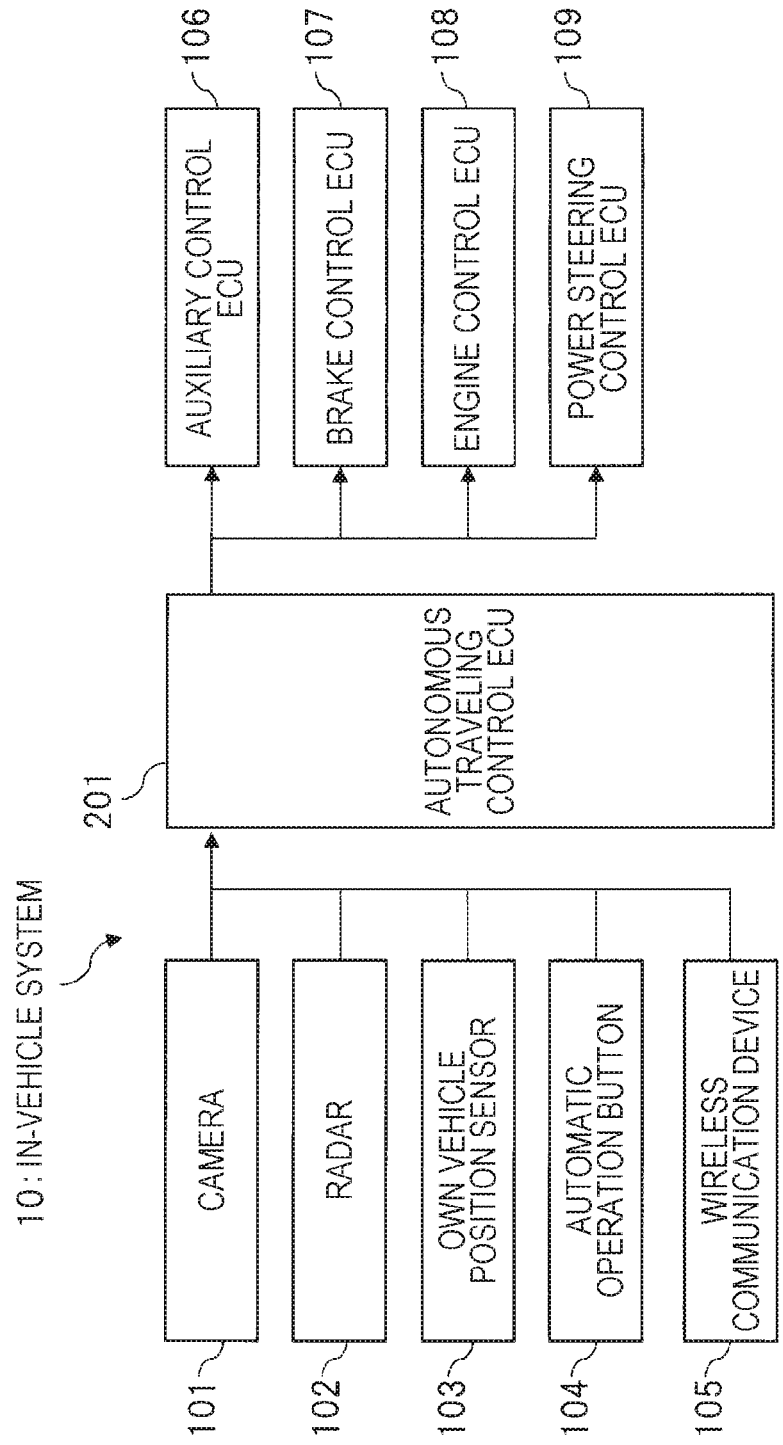
FIG. 1 is a block diagram showing an example of a configuration of an in-vehicle system according to a first embodiment.

In all the drawings for explaining embodiments, the same members will be denoted by the same reference numerals in principle, and the repeated explanation thereof will be omitted.

Hereinafter, the embodiments will be described in detail.

First Embodiment

Configuration Example of In-Vehicle System

FIG. 1 is a block diagram showing an example of a configuration of an in-vehicle system 10 according to a first embodiment.

The in-vehicle system 10 is, for example, a system for controlling autonomous traveling of a vehicle. As shown in FIG. 1, the in-vehicle system 10 includes a camera 101, a radar 102, an own vehicle position sensor 103, an automatic driving button 104, a wireless communication device 105, an auxiliary control electronic control unit (ECU) 106, a brake control ECU 107, an engine control ECU 108, a power steering control ECU 109, and an autonomous traveling control ECU 201.

The camera 101, the radar 102, and the own vehicle position sensor 103 are external recognition sensors that recognize an external situation of the vehicle. The camera 101 and the radar 102 are sensors for recognizing the outside or obtaining a distance to a target object.

The own vehicle position sensor 103 is a sensor for detecting an own vehicle position by a global positioning system (GPS) or the like. The automatic driving button 104 is a button for starting automatic driving control or changing an automatic driving mode. The wireless communication device 105 that is a communication device is connected to a wireless network not shown in the drawings for updating the in-vehicle system by OTA (Over-The-Air), for example.

The autonomous traveling control ECU 201 that is an electronic control device is an automatic driving vehicle traveling control device. The auxiliary control ECU 106 is an auxiliary automatic driving vehicle traveling control device. The brake control ECU 107 is a control device that performs brake control of the vehicle, that is, braking force control.

The engine control ECU 108 is a control device that controls an engine generating a driving force of the vehicle. The power steering control ECU 109 is a control device that controls power steering of the vehicle.

Each of the camera 101, the radar 102, the own vehicle position sensor 103, the automatic driving button 104, and the wireless communication device 105 is connected to the autonomous traveling control ECU 201. Update information including sensor information from the camera 101, the radar 102, and the own vehicle position sensor 103, an automatic driving control signal from the automatic driving button 104, and autonomous traveling control processing information from the wireless communication device 105 is transmitted to the autonomous traveling control ECU 201.

Further, the autonomous traveling control ECU 201, the auxiliary control ECU 106, the brake control ECU 107, the engine control ECU 108, and the power steering control ECU 109 are connected so as to be able to communicate with each other by a controller area network (CAN), for example.

When the autonomous traveling control ECU 201 receives a request to start the automatic driving by the automatic driving button 104, the autonomous traveling control ECU 201 calculates a movement route of the vehicle on the basis of external information of the camera 101, the radar 102, the own vehicle position sensor 103, and the like.

Further, the autonomous traveling control ECU 201 outputs control commands such as braking and driving force to the brake control ECU 107, the engine control ECU 108, and the power steering control ECU 109 so as to move the vehicle according to the above route.

The brake control ECU 107, the engine control ECU 108, and the power steering control ECU 109 receive control commands for autonomous traveling control from the autonomous traveling control ECU 201 and output operation signals to each control target such as an actuator, for example.

That is, the autonomous traveling control ECU 201 is a main control device for outputting a control command, and the brake control ECU 107, the engine control ECU 108, and the power steering control ECU 109 are sub-control devices for controlling the control target according to the control command from the autonomous traveling control ECU 201.

The auxiliary control ECU 106 is an auxiliary control device for performing automatic driving control in place of the autonomous traveling control ECU 201, when the autonomous traveling control ECU 201 is abnormal.

With Respect to Autonomous Traveling Control ECU

Figure 2:
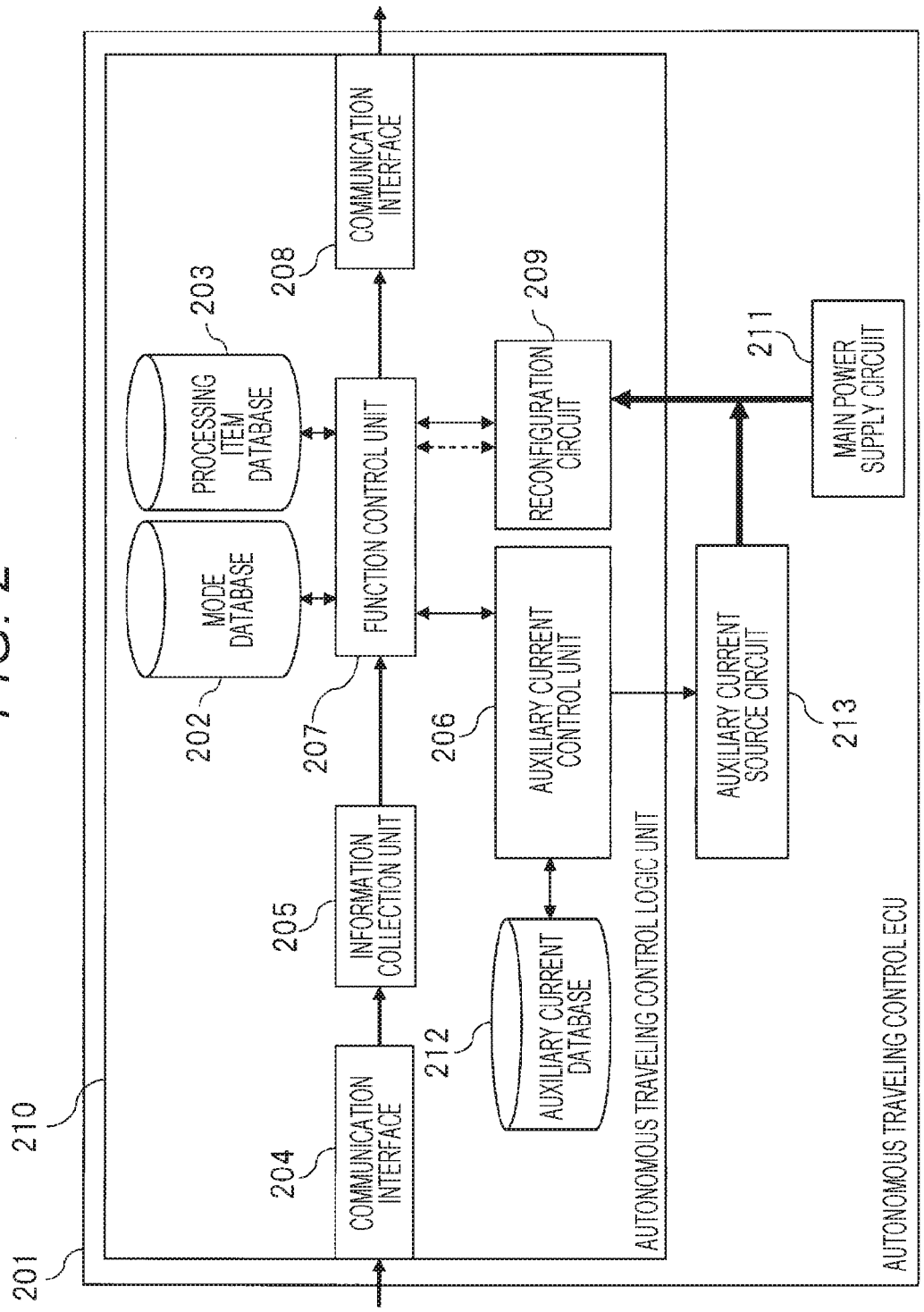
FIG. 2 is a block diagram showing an example of a configuration of an autonomous traveling control ECU included in the in-vehicle system of FIG. 1.

FIG. 2 is a block diagram showing an example of a configuration of the autonomous traveling control ECU 201 included in the in-vehicle system 10 of FIG. 1.

The autonomous traveling control ECU 201 includes an autonomous traveling control logic unit 210, a main power supply circuit 211, and an auxiliary current source circuit 213. The main power supply circuit 211 supplies a power supply voltage to a reconfiguration circuit 209 of the autonomous traveling control logic unit 210 to be described later.

The auxiliary current source circuit 213 adds or reduces a shortage or surplus current, when a load current of the reconfiguration circuit 209 rapidly increases or decreases transiently. Although a configuration of the auxiliary current source circuit 213 is described later, it may be configured by a digital analog converter (DAC) type current source or the like, for example.

In the following description, it is assumed that the main power supply circuit 211 and the auxiliary current source circuit 213 supply a power supply voltage to the reconfiguration circuit 209, and other power supply circuits not shown in the drawings supply the power supply voltage to function blocks in the autonomous traveling control logic unit 210 other than the reconfiguration circuit 209.

The autonomous traveling control logic unit 210 has communication interfaces 204 and 208 (hereinafter, described as the "communication interface 204" in the case of collectively designating the communication interfaces), an information collection unit 205, an auxiliary current control unit 206, a function control unit 207, a reconfiguration circuit 209, a mode database 202, a processing item database 203, and an auxiliary current database 212. Further, the function control unit 207 holds a circuit database not shown in the drawings. The circuit database holds circuit data used by the reconfiguration circuit 209 to reconfigure the circuit.

The communication interface 204 is an interface performing communication according to a predetermined protocol such as a controller area network (CAN) used in a general in-vehicle system. The autonomous traveling control ECU 201 is connected to other device via the communication interface 204 and transmits and receives data.

Specifically, the autonomous traveling control ECU 201 is connected to the camera 101, the radar 102, the own vehicle position sensor 103, the automatic driving button 104, and the wireless communication device 105 of FIG. 1 via the communication interface 204.

Further, the autonomous traveling control ECU 201 is connected to the auxiliary control ECU 106, the brake control ECU 107, the engine control ECU 108, and the power steering control ECU 109 of FIG. 1 via the communication interface 208.

The information collection unit 205 collects sensor information from the camera 101, the radar 102, or the own vehicle position sensor 103 input from the communication interface 204 and an automatic driving control signal from the automatic driving button 104. Further, the information collection unit 205 periodically transfers the collected sensor information and automatic driving control signal to the function control unit 207

Further, if the information collection unit 205 receives update information including autonomous traveling control processing information, circuit data to be updated, and power supply control data from the wireless communication device 105, the information collection unit 205 stores the circuit data to be updated in a circuit database not shown in the drawings and updates contents of the mode database 202, the processing item database 203, and the auxiliary current database 212.

The information collection unit 205 is connected to each database included in the autonomous traveling control logic unit 210 via a control line not shown in the drawings. A processing example of the update information will be described later using FIG. 8.

On the basis of the sensor information and the automatic driving control signal acquired from the information collection unit 205, the function control unit 207 refers to the mode database 202 and first determines an operation mode such as an expressway entrance mode, an automatic parking mode, or an ECU abnormality mode.

The expressway entrance mode is a mode that operates when a vehicle enters an expressway. The automatic parking mode is an operation mode when the vehicle is parked automatically. The ECU abnormality mode is a mode that operates when the autonomous traveling control ECU 201 is abnormal.

Next, processing information indicating how to execute necessary operation processing in the operation mode by the reconfiguration circuit 209 is determined. Specifically, the processing information means the number of divisions of a circuit region of the reconfiguration circuit 209, circuit data for updating each circuit region, an operation time, and the like. The details of the mode database 202 and the processing item database 203 will be described later using FIGS. 6 and 7.

Further, the function control unit 207 changes the reconfiguration circuit 209, on the basis of the processing information described above, and causes the reconfiguration circuit 209 to execute processing of the corresponding operation mode. Here, in FIG. 2, a dotted line arrow between the function control unit 207 and the reconfiguration circuit 209 shows that the function control unit 207 transfers circuit data for reconfiguring a circuit from a circuit database not shown in the drawings and a completion notification thereof. Further, in FIG. 2, a solid line arrow between the function control unit 207 and the reconfiguration circuit 209 shows that execution instructions or execution data of processing and an execution result thereof are transferred.

Further, the function control unit 207 outputs a control command such as braking and driving force from the communication interface 208, on the basis of a result of the processing executed by the reconfiguration circuit 209.

The reconfiguration circuit 209 is a circuit for executing predetermined processing on data, and is configured by hardware capable of changing a circuit configuration such as the FPGA, for example. The circuit configuration of the reconfiguration circuit 209 is changed by the function control unit 207 according to the processing information described above, and the reconfiguration circuit 209 executes predetermined processing.

The auxiliary current control unit 206 acquires mode information indicating an operation mode and an internal timer value managed by the function control unit 207 from the function control unit 207. Here, the internal timer value is a counter value incremented by an internal clock, and is regularly reset in accordance with a control period of autonomous traveling.

The auxiliary current control unit 206 performs synchronization by updating the internal timer value of the auxiliary current control unit 206, on the basis of the acquired internal timer value. In the auxiliary current database 212, information regarding a schedule of auxiliary current control such as a control signal or timing output to the auxiliary current source circuit 213 is stored.

The auxiliary current control unit 206 generates a control signal to be an auxiliary current control signal, on the basis of the auxiliary current database 212 and the internal timer value described above, outputs the control signal to the auxiliary current source circuit 213, and controls an operation of the auxiliary current source circuit 213. Further, the current supplied to the reconfiguration circuit 209 is increased or decreased using the auxiliary current source circuit 213.

The details of the auxiliary current database 212 will be described later using FIG. 5. Further, the details of the auxiliary current control processing will be described later using FIGS. 3 and 4. Here, the main power supply circuit 211 and the auxiliary current source circuit 213 have been described as a dedicated power supply circuit for supplying power to the reconfiguration circuit 209. However, they may be a power supply circuit that supplies power to the entire autonomous traveling control logic unit 210.

The respective function units of the autonomous traveling control logic unit 210, specifically, the information collection unit 205, the function control unit 207, and the auxiliary current control unit 206 are configured by a program executed by a processor or a logic circuit for performing a predetermined operation, for example, the FPGA. For the sake of functional safety of the automatic driving, each function unit of the autonomous traveling control logic unit 210 may be configured by a processor with a plurality of cores adopting a lock step system.

Further, the autonomous traveling control logic unit 210 is physically configured by one electronic control device. Alternatively, it may be logically or physically configured on a plurality of electronic control devices. The program of each function unit described above may operate in a separate thread on the same electronic control device. Alternatively, it may operate on a virtual electronic control device constructed on resources of a plurality of electronic control devices.

Alternatively, without using the auxiliary current database 212, the auxiliary current control unit 206 may roughly estimate a load variation from an operation scale of the reconfiguration circuit 209 obtained from the function control unit 207 and may transmit a necessary current amount as an instruction to the auxiliary current source circuit 213.

With Respect to Database

FIG. 3 is a diagram illustrating the mode database 202 included in the autonomous traveling control logic unit 210 of FIG. 2.

The mode database 202 is referred to by the function control unit 207 of FIG. 2. The mode database 202 associates information acquired from the information collection unit 205 with an operation mode to be selected.

The mode database 202 has a mode selection condition 301 for selecting an operation mode, on the basis of the information acquired from the information collection unit 205, and an operation mode 302 selected by the mode selection condition 301.

For example, in the mode selection condition 301, as an example of application to automatic driving, the case where it is determined that the vehicle has entered an expressway is set as a first mode selection condition. Further, in the operation mode 302, an operation mode of the first mode selection condition is determined as a mode 1.

The first mode selection condition is determined by the function control unit 207 on the basis of parameter information of external recognition sensors such as the camera 101, the radar 102, and the own vehicle position sensor 103 shown in FIG. 1.

Further, in the mode selection condition 301, the case where the function control unit 207 receives a control signal for performing automatic parking by the automatic driving button 104 of FIG. 1 is set as a second mode selection condition, and in the operation mode 302, an operation mode of the second mode selection condition is determined as a mode 2.

Similarly, in the mode selection condition 301, the case where the function control unit 207 detects abnormality of the ECU as failure detection information is set as a third mode selection condition, and in the operation mode 302, an operation mode of the third mode selection condition is determined as a mode 3.

FIG. 4 is a diagram illustrating the processing item database 203 included in the autonomous traveling control logic unit 210 of FIG. 2.

The processing item database 203 is referred to by the function control unit 207 of FIG. 2. The processing item database 203 associates an operation mode with processing contents of the corresponding mode.

The processing item database 203 associates a processing method 402 and processing information 1 (403-1) to processing information 3 (403-3) (in the case of collectively designating the processing information, they are described as the "processing information 403"), for each operation mode 401.

The processing method 402 designates order of one or more processing to be executed, a reconfiguration procedure of a circuit, and the like. The processing information 403 is processing information designated by the processing method 402.

For example, in FIG. 4, when the operation mode 401 is the mode 1, providing one circuit region on the reconfiguration circuit 209 of FIG. 2 and sequentially executing processing of the processing information 1 (403-1), processing of the processing information 2 (403-2), and processing of the processing information 3 (403-3) on the circuit region are held as the processing method 402. Further, circuit data A1 for executing first processing of the mode 1 and a processing time T11 thereof are held as the processing information 1 (403-1).

Similarly, circuit data A2 for executing second processing of the mode 1 and a processing time T12 thereof may be held as the processing information 2 (403-2), and circuit data A3 for executing third processing of the mode 1 and a processing time T13 thereof may be held as the processing information 3 (403-3).

As an example of an application to the automatic driving, the first processing of the mode 1 may be set as sensing processing, the second processing of the mode 1 may be set as behavior prediction processing of a vehicle or a pedestrian, and the third processing of the mode 1 may be set as movement route calculation processing of the vehicle.

Further, when the operation mode 401 is the mode 2, dividing the circuit region into two parts, sequentially executing processing of the processing information 1 (403-1) and the processing information 2 (403-2) in one region and executing processing of the processing information 3 (403-3) in the other region may be held as the processing method 402.

Similarly to when the operation mode 401 is the mode 1, circuit data B1 to B3 for executing the first to third processing of the mode 2, respectively, and processing times T21 to T23 thereof may be held as the processing information 403.

As an example of an application to the automatic driving, any one of the first to third processing of the mode 2 may be set as empty parking space search processing. Further, when the operation mode 401 is the mode 3, dividing the circuit region into three parts, executing respective processing of the processing information 1 (403-1), the processing information 2 (403-2), and the processing information 3 (403-3) in parallel may be held as the processing method 402.

Similarly to when the operation mode 401 is the mode 1, circuit data C1 to C3 for executing the first to third processing of the mode 3, respectively, and processing times T31 to T33 thereof may be held as the processing information 403.

As an example of an application to the automatic driving, any one of the first to third processing of the mode 3 may be set as trajectory securing processing to stop safely. Here, the example in which three pieces of information (processing information 1 (403-1) to processing information 3 (403-3)) are held as the processing information 403 has been shown. However, four or more pieces of information may be held.

FIG. 5 is a diagram illustrating the auxiliary current database 212 included in the autonomous traveling control logic unit 210 of FIG. 2.

In the auxiliary current database 212, information regarding a schedule of auxiliary current control such as a control signal or timing output to the auxiliary current source circuit 213 is stored.

The details will be described below.

The auxiliary current database 212 is referred to by the auxiliary current control unit 206. The auxiliary current database 212 associates an operation mode 501 and auxiliary current control information 0 (503-0) to auxiliary current control information 6 (503-6) (in the case of collectively designating the auxiliary current control information, they are described as the "auxiliary current control information 503") to be control information. The auxiliary current control information 503 is information indicating the contents of auxiliary current control in the operation mode 501.

For example, when the operation mode 501 is the mode 1, as shown in FIG. 5, for the auxiliary current control information 0, a start timer value ts10, an end timer value te10, and a current amount I10(t) are respectively held as the auxiliary current control information 0 (503-0).

The start timer value ts10 is a timer value considering timing to start writing a connection circuit to an interface circuit with the function control unit 207 of FIG. 2 to the reconfiguration circuit 209. Here, the interface circuit is an interface between the function control unit 207 and the reconfiguration circuit 209, and is not shown in FIG. 2 or the like.

The connection circuit is a circuit that is included in the reconfiguration circuit 209 and connects the interface circuit and an operation circuit configured by the reconfiguration circuit 209. The connection circuit is not shown in FIG. 2 or the like.

The end timer value te10 is a timer value considering timing at which a load current variation of the reconfiguration circuit 209 associated with the start of writing converges. The current amount I10(t) is an amount of current injected or extracted from the auxiliary current source circuit 213 at the internal timer value t.

Here, the current amount I10(t) compensates for excess or deficiency in the supply current of the main power supply circuit 211 due to an instantaneous load current variation of the reconfiguration circuit 209 that occurs at the start of writing.

Similarly, the auxiliary current database 212 holds the following information as the auxiliary current control information 1 to the auxiliary current control information 6, when the operation mode 501 is the mode 1.

The auxiliary current control information 1 holds a start timer value ts11, an end timer value te11, and a current amount I11(t). The start timer value ts11 is a timer value considering timing at which the circuit data A1 for executing the first processing of the mode 1 starts to be written to the reconfiguration circuit 209.

The end timer value te11 is a timer value considering timing at which a load current variation of the reconfiguration circuit 209 associated with the start of writing converges. The current amount I11(t) is an amount of current injected or extracted from the auxiliary current source circuit 213 at the internal timer value t.

The auxiliary current control information 2 (503-2) holds a start timer value ts12, an end timer value te12, and a current amount I12(t). The start timer value ts12 is a timer value considering timing at which the first processing of the mode 1 starts to be executed.

The end timer value te12 is a timer value considering timing at which a load current variation of the reconfiguration circuit 209 associated with the start of processing converges. The current amount I12(t) is an amount of current injected or extracted from the auxiliary current source circuit 213 at the internal timer value t.

The auxiliary current control information 3 holds a start timer value ts13, an end timer value te13, and a current amount I13(t). The start timer value ts13 is a timer value considering timing at which the circuit data A2 for executing the second processing of the mode 1 starts to be written to the reconfiguration circuit 209.

The end timer value te13 is a timer value considering timing at which a load current variation of the reconfiguration circuit 209 associated with the start of writing converges. The current amount I13(t) is an amount of current injected or extracted from the auxiliary current source circuit 213 at the internal timer value t.

The auxiliary current control information 4 (503-4) holds a start timer value ts14, an end timer value te14, and a current amount I14(t). The start timer value ts14 is a timer value considering timing at which the second processing of the mode 1 starts to be executed.

The end timer value te14 is a timer value considering timing at which a load current variation of the reconfiguration circuit 209 associated with the start of processing converges. The current amount I14(t) is an amount of current injected or extracted from the auxiliary current source circuit 213 at the internal timer value t.

The auxiliary current control information 5 (503-5) holds a start timer value ts15, an end timer value te15, and a current amount I15(t). The start timer value ts15 is a timer value considering timing at which the circuit data A3 for executing the third processing of the mode 1 starts to be written to the reconfiguration circuit 209.

The end timer value te15 is a timer value considering timing at which a load current variation of the reconfiguration circuit 209 associated with the start of writing converges. The current amount I15(t) is an amount of current injected or extracted from the auxiliary current source circuit 213 at the internal timer value t.

The auxiliary current control information 6 (503-6) holds a start timer value ts16, an end timer value te16, and a current amount I16(t). The start timer value ts16 is a timer value considering timing at which the third processing of the mode 1 starts to be executed.

The end timer value te16 is a timer value considering timing at which a load current variation of the reconfiguration circuit 209 associated with the start of processing converges. The current amount I16(t) is an amount of current injected or extracted from the auxiliary current source circuit 213 at the internal timer value t.

Here, it is assumed that the main power supply circuit 211 and the auxiliary current source circuit 213 supply a power supply voltage to only the reconfiguration circuit 209, as described above. However, they may supply power to the entire autonomous traveling control logic unit 210.

In this case, the amount of current to be injected or extracted from the auxiliary current source circuit 213 in consideration of the load current variation of the entire autonomous traveling control logic unit 210 is stored in the auxiliary current database 212.

Further, the timer value is a value of a counter incremented by an internal clock, is managed by the function control unit 207, and is used for synchronization with the auxiliary current control unit 206. The timer value is adjusted so that the auxiliary current source circuit 213 injects or extracts the current in accordance with the timing at which the load current of the reconfiguration circuit 209 varies, in consideration of a signal delay between the function control unit 207 and the auxiliary current control unit 206 or a control delay until the auxiliary current source circuit 213 injects or extracts the current after starting the auxiliary current control processing by the auxiliary current control unit 206.

The auxiliary current database 212 may store each numerical value on the basis of an actual measurement value or a simulation value before operating as an in-vehicle system. Alternatively, the auxiliary current control unit 206 may create and store the auxiliary current database, on the basis of each piece of information in the processing item database 203 acquired from the function control unit 207.

Further, the auxiliary current control information 503 may include a voltage value, a current value, or a control code for controlling the current to be injected or extracted from the auxiliary current source circuit 213.

Power Supply Control Processing

Next, auxiliary current control processing by the auxiliary current control unit 206 of FIG. 2 will be described using FIGS. 6 and 7.

Figure 6:
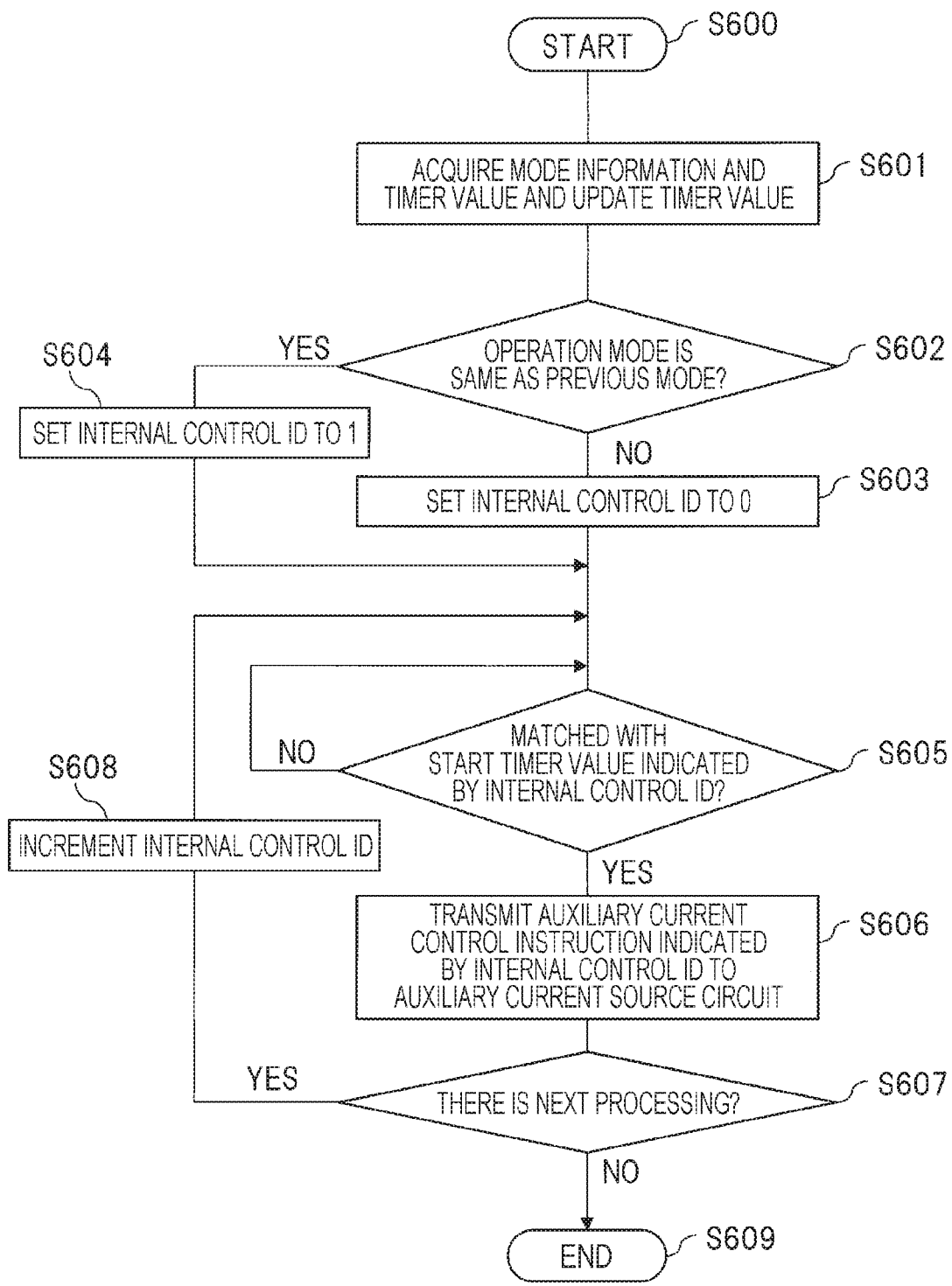
FIG. 6 is a flowchart showing an example of auxiliary current control processing by an auxiliary current control unit included in the autonomous traveling control logic unit of FIG. 2.

FIG. 6 is a flowchart showing an example of auxiliary current control processing by the auxiliary current control unit 206 included in the autonomous traveling control logic unit 210 of FIG. 2.

Here, it is assumed that the auxiliary current database 212 is previously created and stored. Further, an example in which the auxiliary current control unit 206 manages processing order using an internal control ID is shown.

The internal control ID indicates each of numbers of 0 to 6 of the auxiliary current control information 503 in FIG. 5. Further, description is given on the assumption that each of the function control unit 207 and the auxiliary current control unit 206 includes an internal timer.

First, when the auxiliary current control unit 206 starts the auxiliary current control processing (step S600), before an auxiliary current control target operation in the reconfiguration circuit 209 starts, the auxiliary current control unit 206 acquires mode information and an internal timer value from the function control unit 207 and updates an internal timer value of the auxiliary current control unit 206 (step S601).

Next, the auxiliary current control unit 206 determines whether or not a value of an operation mode is the same as a previous mode value (step S602). When it is determined in the processing of step S602 that the value of the operation mode is different from the previous mode value (No), the auxiliary current control unit 206 sets the internal control ID to 0 (step S603). On the other hand, when it is determined that the value of the operation mode is the same as the previous mode value (Yes), the auxiliary current control unit 206 sets the internal control ID to 1 (step S604).

The processing of steps S602 to S604 is to determine whether or not processing for writing the connection circuit to the interface circuit with the function control unit 207 to the reconfiguration circuit 209 is necessary, according to whether or not the operation mode is different from the previous mode. Of course, ID information of the connection circuit may be obtained from the function control unit 207 and it may be determined whether or not the ID information is the same as previous ID information.

After the processing of step S603 or the processing of step S604, the auxiliary current control unit 206 refers to the auxiliary current database 212 and maintains a waiting state until the start timer value indicated by the internal control ID and the internal timer value of the auxiliary current control unit 206 are matched (step S605).

When it is determined in the processing of step S605 that the timer values are matched (Yes), the amount of current IMN(t) injected or extracted by the auxiliary current source circuit 213 and the end timer value teMN, indicated by the internal control ID, are transmitted as an auxiliary current control instruction to the auxiliary current source circuit 213 (S606). Here, the operation mode, N indicates the internal control ID.

The auxiliary current source circuit 213 maintains a waiting state until the auxiliary current control instruction is received, and when the auxiliary current control instruction is received, the auxiliary current source circuit 213 injects or extracts the current so as to obtain the current amount described above. Further, when the internal timer value is matched with the end timer value teMN, a waiting state is maintained again.

Then, the auxiliary current control unit 206 determines whether or not there is next processing (step S607). The auxiliary current control unit 206 can determine whether or not there is the next processing, on the basis of the auxiliary current database 212.

When it is determined in the processing of step S607 that there is the next processing (Yes), the auxiliary current control unit 206 increments the internal control ID (step S608) and returns to the processing of step S605 to prepare for next processing.

When it is determined in the processing of step S607 that there is not the next processing (No), the auxiliary current control unit 206 ends the auxiliary current processing (step S609).

Figure 7:
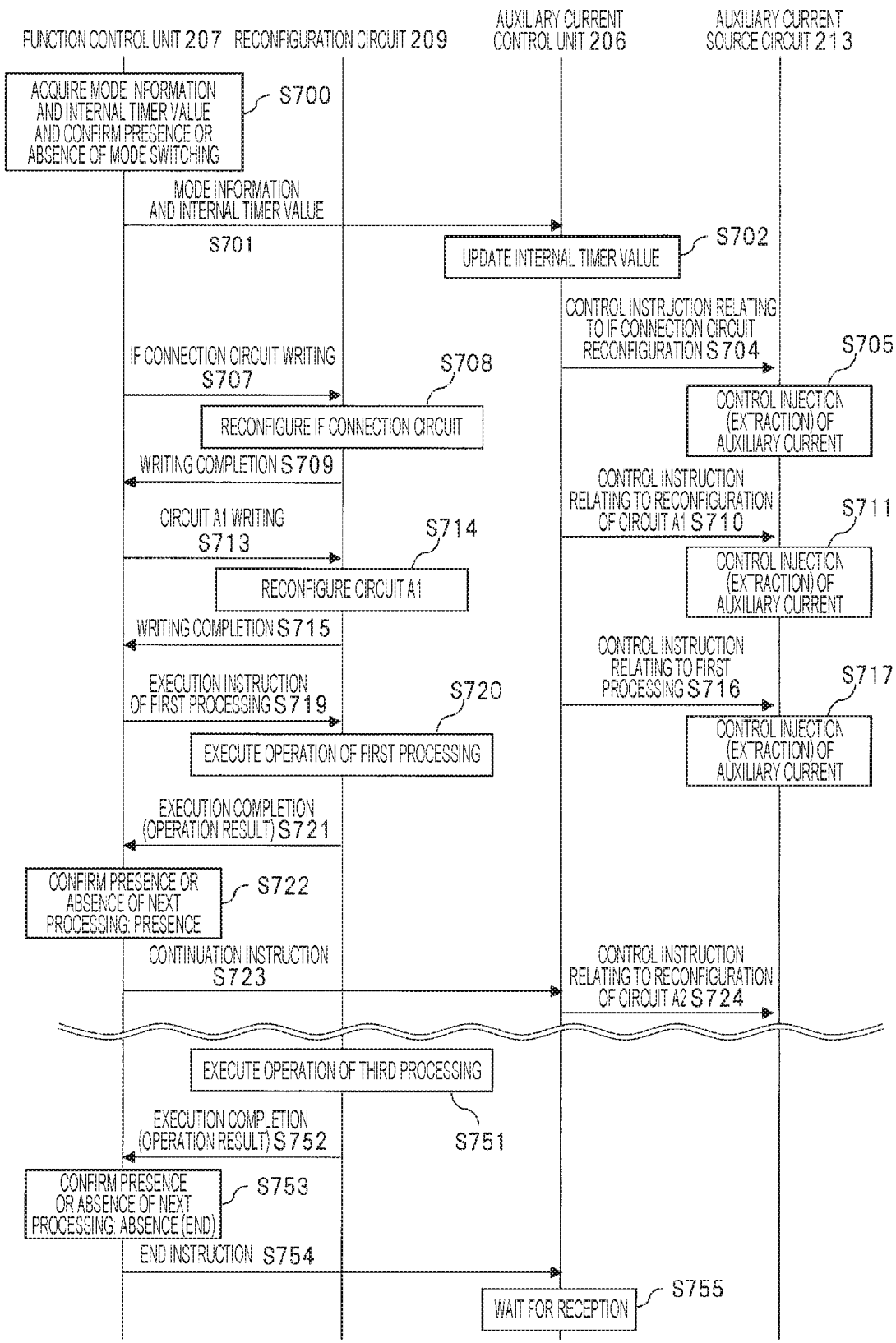
FIG. 7 is a sequence diagram showing an example of auxiliary current control processing by the auxiliary current control unit included in the autonomous traveling control logic unit of FIG. 2.

FIG. 7 is a sequence diagram showing an example of auxiliary current control processing in the auxiliary current control unit 206 included in the autonomous traveling control logic unit 210 of FIG. 2.

In FIG. 7, the case where the operation mode 302 of the auxiliary current database 212 described in FIG. 3 is the mode 1 will be described as an example. Here, it is assumed that the auxiliary current database 212 is previously created and stored.

First, the function control unit 207 acquires the mode information from the mode database 202 and checks whether or not the mode is switched. Further, the function control unit 207 acquires the internal timer value to be managed (step S700). Here, an example in which the mode is switched is shown.

Next, the function control unit 207 sends the mode information and the internal timer value to the auxiliary current control unit 206 (step S701). The auxiliary current control unit 206 updates the internal timer value of the auxiliary current control unit 206, on the basis of the internal timer value (step S702).

By referring to the auxiliary current control information 0 (503-0) relating to the reconfiguration of the connection circuit to the interface circuit with the function control unit 207 held in the auxiliary current database 212, when the start timer value ts10 and the internal timer value of the auxiliary current control unit 206 are matched, the amount of current I10(t) injected or extracted by the auxiliary current source circuit 213 and the end timer value te10 are transmitted as an auxiliary current control instruction to the auxiliary current source circuit 213 (step S704).

The auxiliary current source circuit 213 maintains a waiting state until the auxiliary current control instruction is received. When the auxiliary current control instruction is received, the auxiliary current source circuit 213 injects or extracts the current so that the current amount of the auxiliary current control instruction is obtained, and when the internal timer value is matched with the end timer value te10, the auxiliary current source circuit 213 maintains a waiting state again (step S705).

The function control unit 207 writes connection circuit data with the interface circuit to the reconfiguration circuit 209 slightly after the start of the current control by the processing of step S705, for example, after about 1 millisecond or less (step S707).

The reconfiguration circuit 209 reconfigures the connection circuit (step S708) and notifies the function control unit 207 of writing completion (step S709). Further, by referring to the auxiliary current control information 1 (503-1) relating to the reconfiguration of the circuit data A1 held in the auxiliary current database 212, when the internal timer value and the internal timer value of the auxiliary current control unit 206 are matched, the auxiliary current control unit 206 transmits the amount of current I11(t) injected or extracted by the auxiliary current source circuit 213 and the end timer value te11 as an auxiliary current control instruction to the auxiliary current source circuit 213 (step S710).

The auxiliary current source circuit 213 that has received the auxiliary current control instruction injects or extracts the current so that the current amount of the auxiliary current control instruction is obtained, and when the internal timer value is matched with the end timer value te11, the auxiliary current source circuit 213 maintains a waiting state (step S711).

The function control unit 207 writes data of the circuit A1 to the reconfiguration circuit 209 slightly after the start of the current control in the processing of step S711 (step S713). The reconfiguration circuit 209 reconfigures the circuit A1 (step S714) and notifies the function control unit 207 of writing completion (step S715).

Next, by referring to the auxiliary current control information 2 (503-2) relating to the first processing held in the auxiliary current database 212, when the internal timer value and the internal timer value of the auxiliary current control unit 206 are matched, the auxiliary current control unit 206 transmits the amount of current I12(t) injected or extracted by the auxiliary current source circuit 213 and the end timer value te12 as an auxiliary current control instruction to the auxiliary current source circuit 213 (step S716).

The auxiliary current source circuit 213 that has received the auxiliary current control instruction injects or extracts the current so that the current amount described above is obtained, and when the internal timer value is matched with the end timer value te12, the auxiliary current source circuit 213 maintains a waiting state (step S717).

The function control unit 207 notifies the reconfiguration circuit 209 of an execution instruction of the first processing slightly after the start of the current control in the processing of step S717 (step S719). The reconfiguration circuit 209 executes an operation of the first processing (step S720) and notifies the function control unit 207 of execution completion together with an operation result, in other words, a processing result (step S721). Here, the function control unit 207 may hold the operation result of the first processing and may use it for an operation of subsequent processing.

Further, the function control unit 207 confirms presence or absence of next processing (step S722). Here, an example in which the operation mode 501 is the mode 1 and there is the second processing to be the next processing is shown.

The function control unit 207 transmits a continuation instruction of the auxiliary current control to the auxiliary current control unit 206 (step S723). By referring to the power supply control information 3 (503-3) relating to the reconfiguration of the circuit data A2 held in the auxiliary current database 212, when the internal timer value and the internal timer value of the auxiliary current control unit 206 are matched, the auxiliary current control unit 206 transmits the amount of current I13(t) injected or extracted by the auxiliary current source circuit 213 and the end timer value te13 as an auxiliary current control instruction to the auxiliary current source circuit 213 (step S724).

Hereinafter, similarly to the processing of steps S705 to S722 described above, the circuit data A2 and the second processing using the circuit data A2 and the circuit data A3 and the third processing using the circuit data A3 are performed (steps S751 and S752).

Further, the function control unit 207 confirms presence or absence of next processing (step S753). Here, the operation mode 501 is the mode 1, there is no next processing, an end instruction is sent to the auxiliary current control unit 206 (step S754), and the auxiliary current control unit 206 receives the end instruction and waits for reception (step S755), so that the sequence of the auxiliary current control processing ends.

In the above description, each of the function control unit 207 and the auxiliary current control unit 206 includes the internal timer. However, the function control unit 207 and the auxiliary current control unit 206 may include a common internal timer.

In the automatic driving, it is required to repeatedly perform various processing such as sensing processing, distance calculation processing, behavior prediction processing of a vehicle and a pedestrian, and movement route calculation processing of the vehicle. For this reason, the autonomous traveling control logic unit 210 periodically performs processing on the basis of collected sensor information and automatic driving control signals. Therefore, as described above, the auxiliary current control unit 206 does not necessarily have to obtain each information every period from the function control unit 207.

Further, in the case where a failure occurs in the auxiliary current control unit 206 and the auxiliary current control of the auxiliary current source circuit 213 cannot be performed normally, for example, a control delay increases during operation, an alarm signal or the like may be sent to the function control unit 207 and a delay may be given to a start time of the reconfiguration processing or the operation processing of the reconfiguration circuit 209.

Further, in the case where the main power supply circuit 211 and the auxiliary current source circuit 213 also perform power supply voltage supply other than the reconfiguration circuit 209, for a block of other autonomous traveling control logic unit, an operation may be performed avoiding a section where a load variation of the reconfiguration circuit 209 occurs. Alternatively, the operation of the same section may be caused to be redundant.

Extension of Operation Mode

Figure 8:
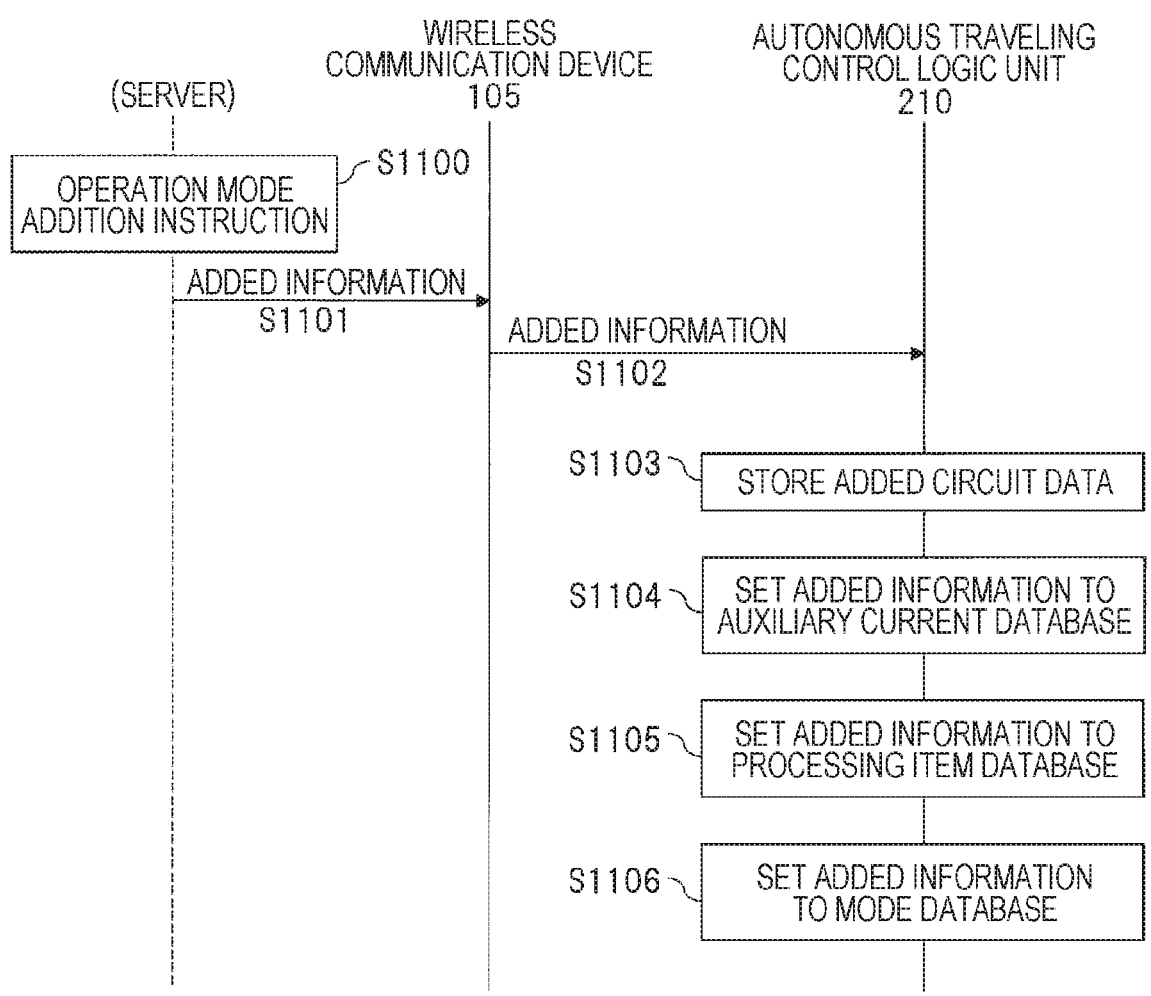
FIG. 8 is a sequence diagram showing an example of operation mode extension in the in-vehicle system of FIG. 1.

FIG. 8 is a sequence diagram showing an example of operation mode extension in the in-vehicle system 10 of FIG. 1.

In FIG. 8, an example of adding an operation mode of the automatic driving via a wireless network by OTA (Over-The-Air) from a server on a cloud or the like is shown.

First, when an addition instruction of the operation mode is set to the server (step S1100), information regarding the operation mode to be added is transferred to the wireless communication device 105 of the in-vehicle system 10 of FIG. 1 (S1101). Here, the wireless communication device 105 may be configured to be provided in the autonomous traveling control ECU.

Here, the information regarding the operation mode to be added is, for example, contents of the mode database 202, the processing item database 203, and the auxiliary current database 212 and circuit data of the operation mode to be added.

Next, the wireless communication device 105 transfers the received added information to the autonomous traveling control logic unit 210 (step S1102). Further, the autonomous traveling control logic unit 210 stores the circuit data in the circuit database (step S1103).

The autonomous traveling control logic unit 210 sets the operation mode 501 and the auxiliary current control information 503 to be added to the auxiliary current database 212 (step S1104). Further, the autonomous traveling control logic unit 210 sets the operation mode 401, the processing method 402, and the processing information 403 to be added to the processing item database 203 (step S1105).

Then, the autonomous traveling control logic unit 210 adds the mode selection condition 301 and the operation mode 302 to the mode database 202 (step S1106) and completes the processing.

As a result, it is possible to flexibly reconfigure the circuit according to a period interval of period processing or an operation load required for the operation mode of the automatic driving, specifically, performance, delay, or the like. Further, when a new operation mode of the automatic driving is added, it is possible to additionally introduce, into the autonomous traveling control ECU 201, circuit data or a processing method to be used in the operation mode to be added, without affecting the operation mode being used.

Modification of Autonomous Traveling Control ECU

Figure 9:
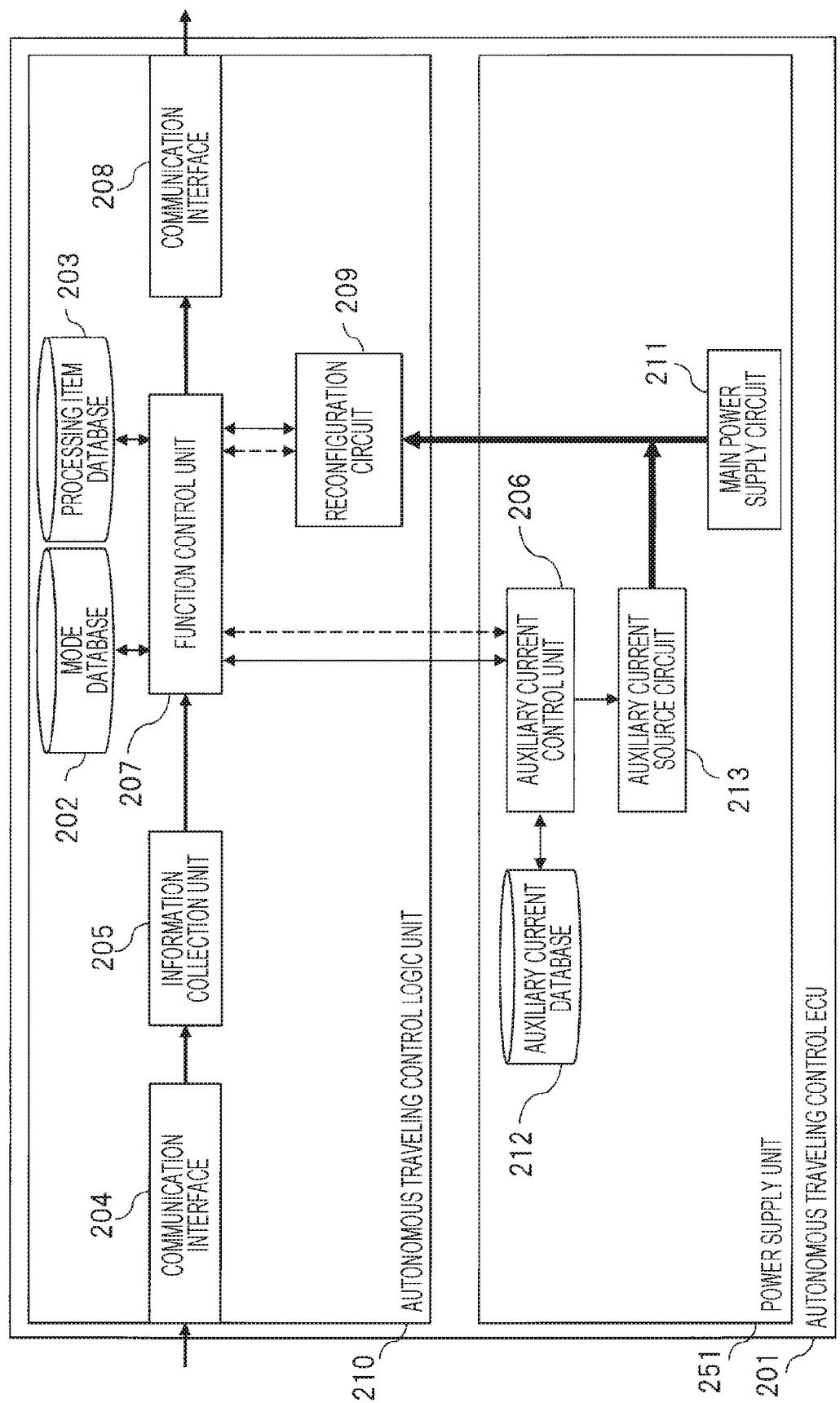
FIG. 9 is a block diagram showing a modification of the autonomous traveling control ECU included in the in-vehicle system of FIG. 1.

FIG. 9 is a block diagram showing a modification of the autonomous traveling control ECU 201 included in the in-vehicle system 10 of FIG. 1.

As shown in FIG. 9, the autonomous traveling control ECU 201 includes the autonomous traveling control logic unit 210 and a power supply unit 251 to be a power supply device. In this case, the autonomous traveling control ECU 201 of FIG. 9 is different from the autonomous traveling control ECU 201 of FIG. 2 in that the power supply unit 251 is provided with the main power supply circuit 211, the auxiliary current source circuit 213, the auxiliary current database 212, and the auxiliary current control unit 206. Since other connection configuration is similar to that in FIG. 2, the description will be omitted.

Even in this case, description is given on the assumption that the power supply unit 251 supplies a power supply voltage to the reconfiguration circuit 209 and other power supply circuit not shown in the drawings supplies a power supply voltage to the autonomous traveling control logic unit 210 other than the reconfiguration circuit 209.

As described above, it may be considered that a main difference from FIG. 2 is that the auxiliary current control unit 206 and the auxiliary current database 212 are not included in the autonomous traveling control logic unit 210 but are included in the power supply unit 251 together with the main power supply circuit 211 and the auxiliary current source circuit 213, and basic processing and control are similar to those in the above description using FIG. 2.

As such, functionally separating the main logic unit of the automatic traveling control and the power supply circuit can be advantageous in terms of functional safety.

In the autonomous traveling control ECU 201, the auxiliary current control unit 206 obtains information regarding the schedule of the reconfiguration and the operation from the function control unit 207 that controls the reconfiguration and the operation of the reconfiguration circuit 209.

Further, the auxiliary current control unit 206 controls the auxiliary current source circuit 213 so that the current to be supplied to the reconfiguration circuit 209 is increased or decreased in accordance with the timing of the load variation due to the reconfiguration and the operation of the reconfiguration circuit 209.

As described above, a transient increase or decrease in the output voltage of the main power supply circuit 211 can be reduced. As a result, a highly reliable electronic control device, that is, the autonomous traveling control ECU 201 can be provided at low cost and in a small area.

Second Embodiment

Hereinafter, an autonomous traveling control ECU according to a second embodiment will be described using FIGS. 10 to 13.

Configuration Example of Autonomous Traveling Control ECU

Figure 10:
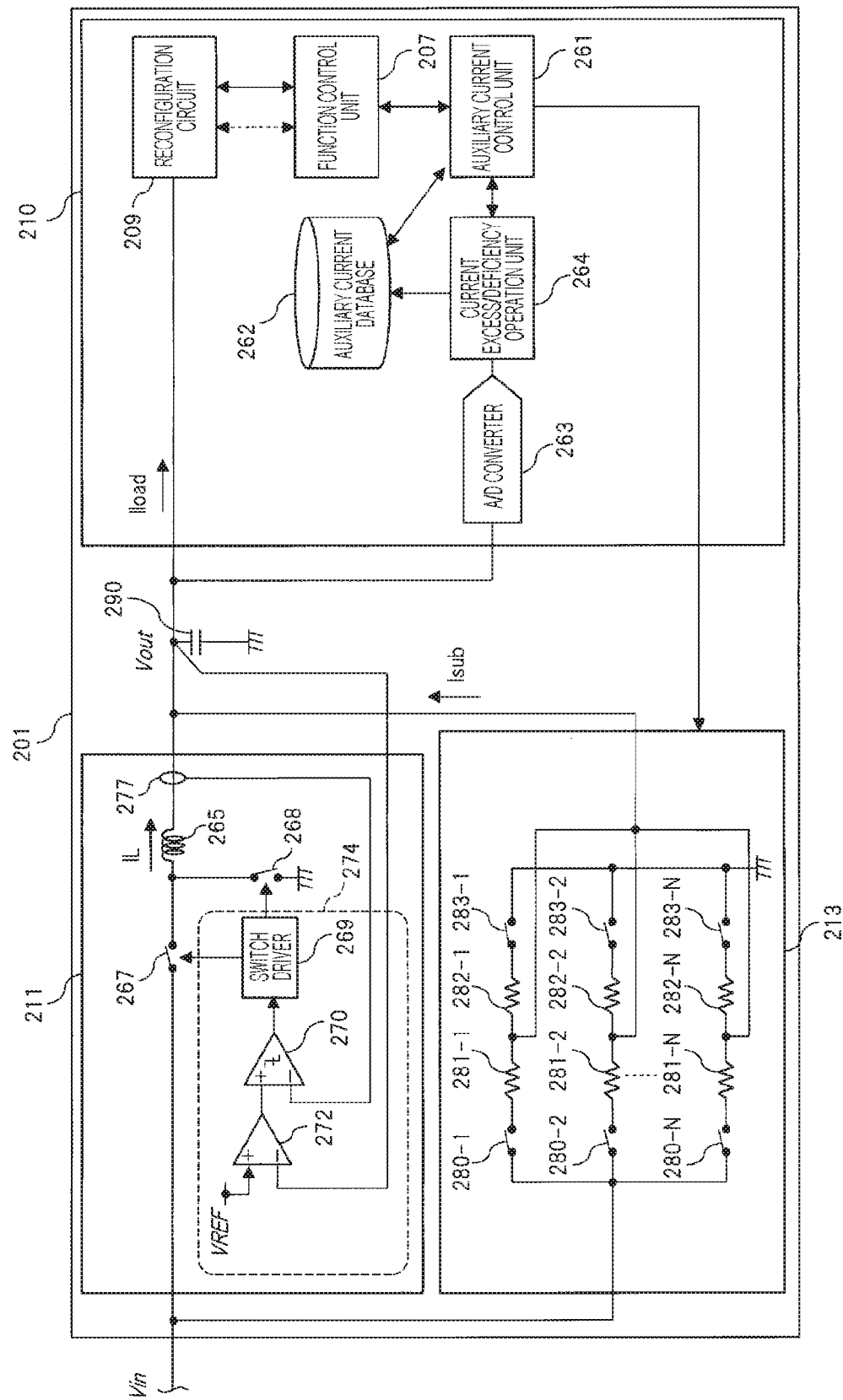
FIG. 10 is a block diagram showing an example of an autonomous traveling control ECU according to a second embodiment.

FIG. 10 is a block diagram showing an example of an autonomous traveling control ECU 201 according to the second embodiment.

The autonomous traveling control ECU 201 includes an autonomous traveling control logic unit 210, a main power supply circuit 211, an auxiliary current source circuit 213, and a capacitor 290. The autonomous traveling control logic unit 210 has a function control unit 207, an auxiliary current control unit 261, a reconfiguration circuit 209, an auxiliary current database 262, a current excess/deficiency operation unit 264, and an analog/digital (A/D) converter 263.

The function control unit 207 holds a circuit database not shown in the drawings. The circuit database holds circuit data used by the reconfiguration circuit 209 to reconfigure the circuit.

Further, although not shown in the drawings, the autonomous traveling control logic unit 210 has communication interfaces 204 and 208, an information collection unit 205, a mode database 202, and a processing item database 203, similarly to FIG. 2 of the first embodiment.

The main power supply circuit 211 is configured to include a switching power supply circuit, and supplies a power supply voltage to the reconfiguration circuit 209 of the autonomous traveling control logic unit 210.

The auxiliary current source circuit 213 adds or reduces a shortage or surplus current, when a load current of the reconfiguration circuit 209 rapidly increases or decreases transiently.

In the following description, it is assumed that the main power supply circuit 211 and the auxiliary current source circuit 213 supply a power supply voltage to the reconfiguration circuit 209, and a power supply circuit not shown in the drawings supplies the power supply voltage to components of the autonomous traveling control logic unit 210 other than the reconfiguration circuit 209.

The auxiliary current control unit 261 acquires mode information and an internal timer value managed by the function control unit 207 from the function control unit 207. The auxiliary current control unit 261 performs synchronization by updating the internal timer value of the auxiliary current control unit 261, on the basis of the acquired internal timer value. In the auxiliary current database 262, information regarding a schedule of auxiliary current control such as a control signal or timing to the auxiliary current source circuit 213 is stored.

The auxiliary current control unit 261 controls the auxiliary current source circuit 213, on the basis of the auxiliary current database 212 and the internal timer value described above, and increases or decreases a current supplied to the reconfiguration circuit 209.

Here, in order to perform auxiliary current control with higher accuracy, an output voltage Vout of the main power supply circuit 211 is digitized by the A/D converter 263, a correction operation to be described later is performed by the current excess/deficiency operation unit 264, and the auxiliary current database 262 is updated appropriately. The details of the power supply control database will be described later.

The main power supply circuit 211 to be a switching power supply circuit is configured to include an inductor current control unit 274, switches 267 and 268, an inductor 265, and a current sensor 277. Here, a step-down switching power supply circuit using a pulse width modulation (PWM) control method will be described as an example.

The inductor current control unit 274 increases or decreases an inductor current IL flowing through the inductor 265 by performing ON/OFF control of the switches 267 and 268. The output voltage Vout generated by a load current Iload flowing through the reconfiguration circuit 209 has a large ripple due to a variation in the inductor current IL. For this reason, the capacitor 290 is inserted for smoothing to obtain a voltage close to a direct current.

The inductor current control unit 274 is configured to include a switch driver 269, a PWM generator 270, and an error detector 272. A reference voltage VREF and the observed output voltage Vout are input to the error detector 272 and a difference between both the voltages is output from the error detector 272.

The difference is input to the PWM generator 270 together with the output of the current sensor 277. As a result, a PWM signal according to the above difference is output from the PWM generator 270. The switch driver 269 performs ON/OFF control of the switches 267 and 268 according to the PWM signal and adjusts the inductor current IL.

The main power supply circuit 211 operates to constantly maintain the output voltage Vout by such a feedback system and steps down an input voltage Vin. However, due to the feedback control, when there is a rapid load variation in the reconfiguration circuit 209, following of the output voltage Vout is disabled and a transient increase or decrease occurs at timing of the load variation.

An output current Isub from the auxiliary current source circuit 213 compensates for the transient increase or decrease, and can inject or extract the current to the reconfiguration circuit 209. The auxiliary current source circuit 213 is configured to have switches 280-1 to 280-N, switches 283-1 to 283-N, resistors 281-1 to 281-N, and resistors 282-1 to 282-N.

The input voltage Vin is connected to one connection unit of the switches 280-1 to 280-N so that the input voltage Vin is input. One connection unit of the resistors 281-1 to 281-N is connected to the other connection units of the switches 280-1 to 280-N, and a voltage output unit that outputs the output voltage Vout of the main power supply circuit 211 is connected to the other connection units of the resistors 281-1 to 281-N.

The voltage output unit that outputs the output voltage Vout of the main power supply circuit 211 is connected to one connection unit of the resistors 282-1 to 282-N, and one connection unit of the switches 283-1 to 283-N is connected to the other connection units of the resistors 282-1 to 282-N.

Further, the other connection units of the switches 283-1 to 283-N are connected to a reference potential. Here, the resistors 281-1 to 281-N and the resistors 282-1 to 282-N may have the same resistance values.

In the auxiliary current source circuit 213, the switch 280-1 and the resistor 281-1 configure a first auxiliary current circuit, and the switch 283-1 and the resistor 282-1 configure a second auxiliary current circuit.

The switch 280-1 is a first switch, and the resistor 281-1 is a first resistor. The switch 283-1 is a second switch, and the resistor 282-1 is a second resistor.

Similarly, each of the switches 280-2 to 280-N and each of the resistors 281-2 to 281-N configure a first auxiliary current circuit. Further, each of the switches 283-2 to 283-N and each of the resistors 282-2 to 282-N configure a second auxiliary current circuit.

When the supply current is largely insufficient due to a sudden load change of the reconfiguration circuit 209, a large injection current is required. Therefore, the auxiliary current control unit 261 performs control so that an ON ratio of the switches 280-1 to 280-N is increased and the switches 283-1 to 283-N are turned off.

Conversely, if the supply current is excessively large, in order to increase a current extraction amount, the auxiliary current control unit 261 performs control so that the switches 280-1 to 280-N are turned off and an ON ratio of the switches 283-1 to 283-N is increased.

Since the auxiliary current source circuit 213 has a simple configuration including only the switches and the resistors, a high response speed with respect to the load variation can be realized at low cost. In the current sensor 277, a current detection circuit using a current transformer, a Hall element, or a giant magnetic resistance (GMR) element or the like may be used.

Figure 11:
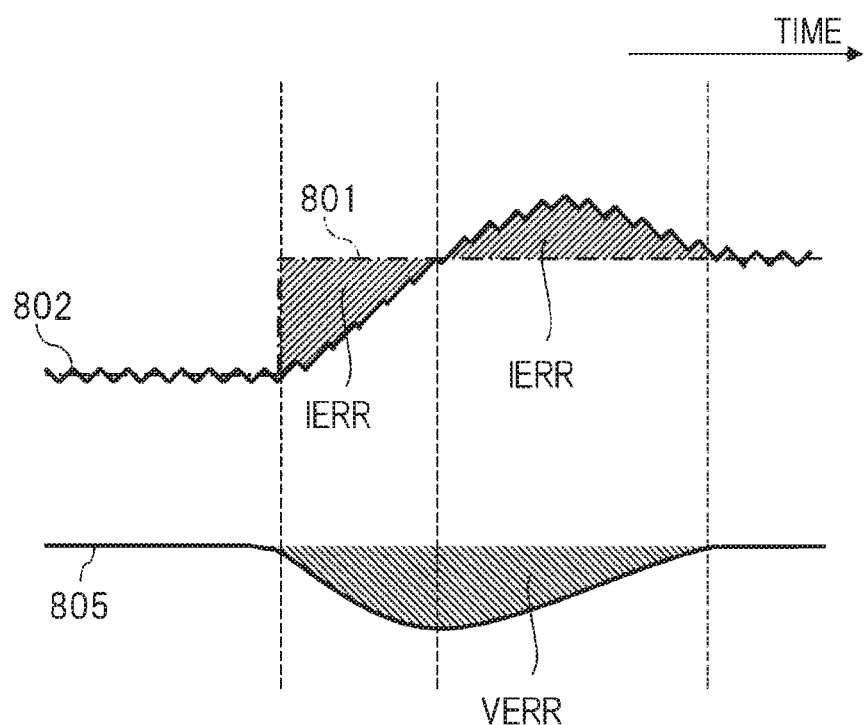
FIG. 11 is a schematic diagram showing an example of changes of an inductor current waveform and an output voltage of a switching power supply circuit in the case of not using auxiliary current control examined by the present inventors.

FIG. 11 is a schematic diagram showing an example of changes of an inductor current waveform and an output voltage of a switching power supply circuit in the case of not using auxiliary current control examined by the present inventors.

As shown in the drawing, since an inductor current 802 follows with a delay at timing when a load current 801 suddenly changes, in accordance with an amount of electric charge to be insufficient or excessive (this corresponds to an output current error IERR shown by hatching in the drawing), a voltage drop with a large output voltage error VERR shown by hatching in the drawing occurs in an output voltage 805. The output current error IERR at this time can be estimated as follows using a capacity value COUT of the capacitor 290.

[Formula 1]

$$IERR(t) = COUT \frac{dVERR(t)}{dt} \qquad \text{(Formula 1)}$$

Figure 12:
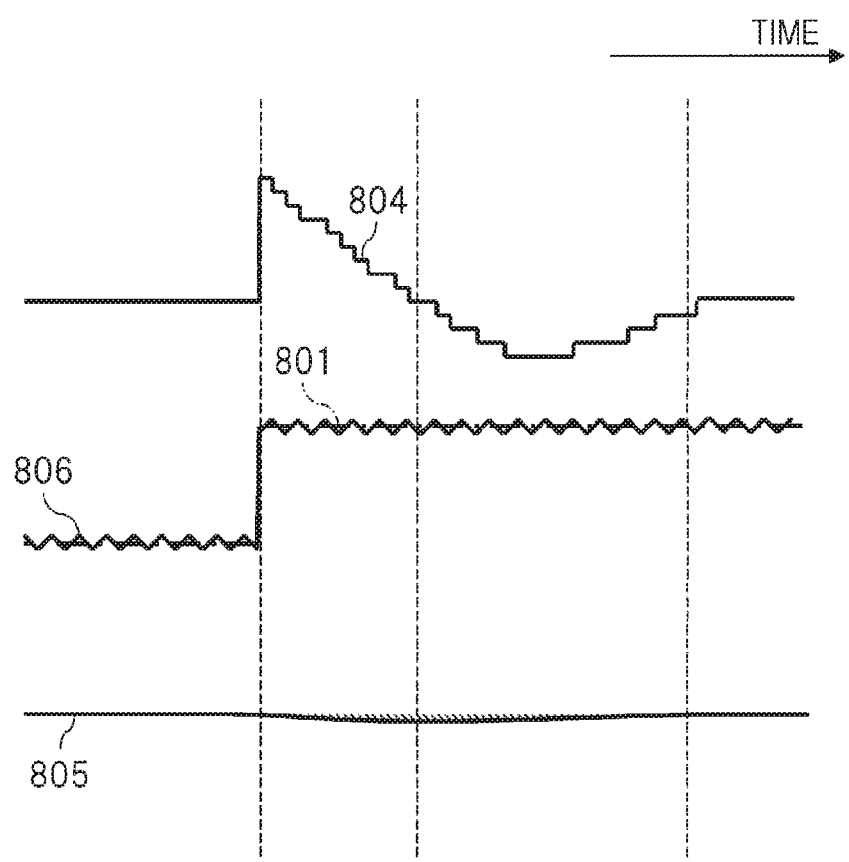
FIG. 12 is a schematic diagram showing an example of changes of an auxiliary current waveform, an output current waveform, and an output voltage in the case of using the auxiliary current control in the autonomous traveling control ECU of FIG. 10.

FIG. 12 is a schematic diagram showing an example of changes of an auxiliary current waveform, an output current waveform, and an output voltage in the case of using the auxiliary current control in the autonomous traveling control ECU 201 of FIG. 10.

On the other hand, in the case of using the auxiliary current control, that is, in the case of the autonomous traveling control ECU 201 in FIG. 10, as shown in FIG. 12, an auxiliary current 804 is output from the auxiliary current source circuit 213 at the timing of the load variation, in accordance with an auxiliary current control instruction from the auxiliary current control unit 261.

As a result, a waveform of an output current 806 to be the sum of the inductor current and the auxiliary current 804, approaches the waveform of the load current 801. Here, in order to cause both sides to be matched and reduce the voltage drop, a correction operation is performed by the current excess/deficiency operation unit 264 using the output voltage Vout digitized by the A/D converter 263.

The current excess/deficiency operation unit 264 calculates the output voltage error VERR from the output voltage Vout, and derives the output current error IERR using the above formula 1. The auxiliary current control information stored in the auxiliary current database 212 is updated using the output current error IERR. The updating of the auxiliary current database 212 is performed by the auxiliary current control unit 261, for example. Alternatively, the updating of the auxiliary current database may be performed by the current excess/deficiency operation unit 264.

By using this information and performing auxiliary current control at the time of a next load variation, the output voltage can be settled within a narrower voltage range. As a result, it is possible to perform control of the output voltage Vout with high accuracy and high reliability.

Further, the correction operation is performed on the basis of a signal delay between the function control unit 207 and the auxiliary current control unit 261 or a control delay until the auxiliary current source circuit 213 injects or extracts the current after starting the auxiliary current control processing by the auxiliary current control unit 261, so that it is possible to perform control with higher accuracy and higher reliability.

Further, here, the output voltage is used for the current excess/deficiency operation. However, for example, the output current or the current flowing through the capacitor 290 may be detected, and the current excess/deficiency may be derived from the difference from the load current.

Power Supply Control Database

FIG. 13 is a diagram illustrating an example of the auxiliary current database 262 included in the autonomous traveling control ECU 201 of FIG. 10.

In the auxiliary current database 262, information regarding a schedule of auxiliary current control such as a control signal or timing output to the auxiliary current source circuit 213 is stored.

The details will be described below.

The auxiliary current database 212 is referred to by the auxiliary current control unit 261, and associates an operation mode 511 and auxiliary current control information 0 (513-0) to auxiliary current control information 6 (513-6) (in the case of collectively designating the auxiliary current control information, they are described as the "auxiliary current control information 513") to be auxiliary current control contents of the corresponding mode.

For example, in FIG. 13, when the operation mode 511 is a mode 1, for the auxiliary current control information 0 (513-0), a start timer value ts10, an end timer value te10, and a data matrix SW10 (SN, t) are held as the auxiliary current control information 0 (513-0).

The start timer value ts10 is a timer value considering timing to start writing a connection circuit to an interface circuit with the function control unit 207 to the reconfiguration circuit 209. The end timer value te10 is a timer value considering timing at which a load current variation of the reconfiguration circuit 209 associated with the start of writing converges.

The data matrix SW10 (SN, t) is a data matrix indicating an ON/OFF state of each switch in the auxiliary current source circuit 213 at an internal timer value t. Here, SN is information of a switch ID.

The auxiliary current source circuit 213 is operated by ON/OFF of the switch group to compensate for excess or deficiency in the supply current of the main power supply circuit 211 due to an instantaneous load current variation of the reconfiguration circuit 209 that occurs at the start of writing.

The auxiliary current control information 1 (513-1) holds a start timer value ts11, an end timer value te11, and a data matrix SW11 (SN, t). The start timer value ts11 is a timer value considering timing at which the circuit data A1 for executing the first processing of the mode 1 starts to be written to the reconfiguration circuit 209.

The end timer value te11 is a timer value considering timing at which a load current variation associated with the start of writing converges. The data matrix SW11 (SN, t) is a data matrix indicating an ON/OFF state of each switch at the internal timer value t.

The auxiliary current control information 2 (513-2) holds a start timer value ts12, an end timer value te12, and a data matrix SW12 (SN, t). The start timer value ts12 is a timer value considering timing at which the first processing of the mode 1 starts to be executed.

The end timer value te12 is a timer value considering timing at which a load current variation associated with the start of the processing converges. The data matrix SW12 (SN, t) is a data matrix indicating an ON/OFF state of each switch in the auxiliary current source circuit 213 at the internal timer value t.

The auxiliary current control information 3 (513-3) holds a start timer value ts13, an end timer value te13, and a data matrix SW13 (SN, t). The start timer value ts13 is a start timer value considering timing at which circuit data A2 for executing second processing of the mode 1 starts to be written to the reconfiguration circuit 209.

The end timer value te13 is a timer value considering timing at which a load current variation associated with the start of writing converges. The data matrix SW13 (SN, t) is a data matrix indicating an ON/OFF state of each switch at the internal timer value t.

The auxiliary current control information 4 (503-4) holds a start timer value ts14, an end timer value te14, and a data matrix SW14 (SN, t). The start timer value ts14 is a timer value considering timing at which the second processing of the mode 1 starts to be executed.

The end timer value te14 is a timer value considering timing at which a load current variation associated with the start of the processing converges. The data matrix SW14 (SN, t) is a data matrix indicating an ON/OFF state of each switch at the internal timer value t.

The auxiliary current control information 5 (513-5) holds a start timer value ts15, an end timer value te15, and a data matrix SW15 (SN, t). The start timer value ts15 is a timer value considering timing at which the circuit data A3 for executing the third processing of the mode 1 starts to be written to the reconfiguration circuit 209.

The end timer value te15 is a timer value considering timing at which a load current variation associated with the start of writing converges. The data matrix SW15 (SN, t) is a data matrix indicating an ON/OFF state of each switch at the internal timer value t.

The auxiliary current control information 6 (513-6) holds a start timer value ts16, an end timer value te16, and a data matrix SW16 (SN, t). The start timer value ts16 is a timer value considering timing at which the third processing of the mode 1 starts to be executed.

The end timer value te16 is a timer value considering timing at which a load current variation associated with the start of the processing converges. The data matrix SW16 (SN, t) is a data matrix indicating an ON/OFF state of each switch at the internal timer value t.

Further, the timer value is a value of a counter incremented by an internal clock, is managed by the function control unit 207, and is used for synchronization of the auxiliary current control unit 261. The timer value is adjusted so that the auxiliary current source circuit 213 injects or extracts the current in accordance with the timing at which the load current of the reconfiguration circuit 209 varies, in consideration of a signal delay between the function control unit 207 and the auxiliary current control unit 261 or a control delay until the auxiliary current source circuit 213 injects or extracts the current after starting the auxiliary current control processing by the auxiliary current control unit 261.

The auxiliary current database 212 may store each numerical value on the basis of an actual measurement value or a simulation value before operating as an in-vehicle system. Alternatively, the auxiliary current control unit 261 may create and store the auxiliary current database, on the basis of each piece of information in the processing item database acquired from the function control unit 207.

Further, the main power supply circuit 211 that is the switching power supply circuit described above may be controlled by, for example, a hysteresis control method instead of being controlled by a PWM control method. Further, as technology for observing the output voltage to be supplied to the reconfiguration circuit 209, for example, a high resistor or an operational amplifier for voltage division may be used in a previous step of the A/D converter 263.

As described above, the auxiliary current to be output by the auxiliary current source circuit can be set with higher accuracy by the current excess/deficiency operation unit. Further, by configuring the auxiliary current source circuit 213 using a simple analog circuit, settling the output voltage within a narrower voltage range can be realized at low cost, even when a load variation occurs due to the reconfiguration and the operation of the reconfiguration circuit 209.

As a result, the autonomous traveling control ECU 201 with high reliability can be provided at low cost and in a small area.

Third Embodiment

Figure 14:
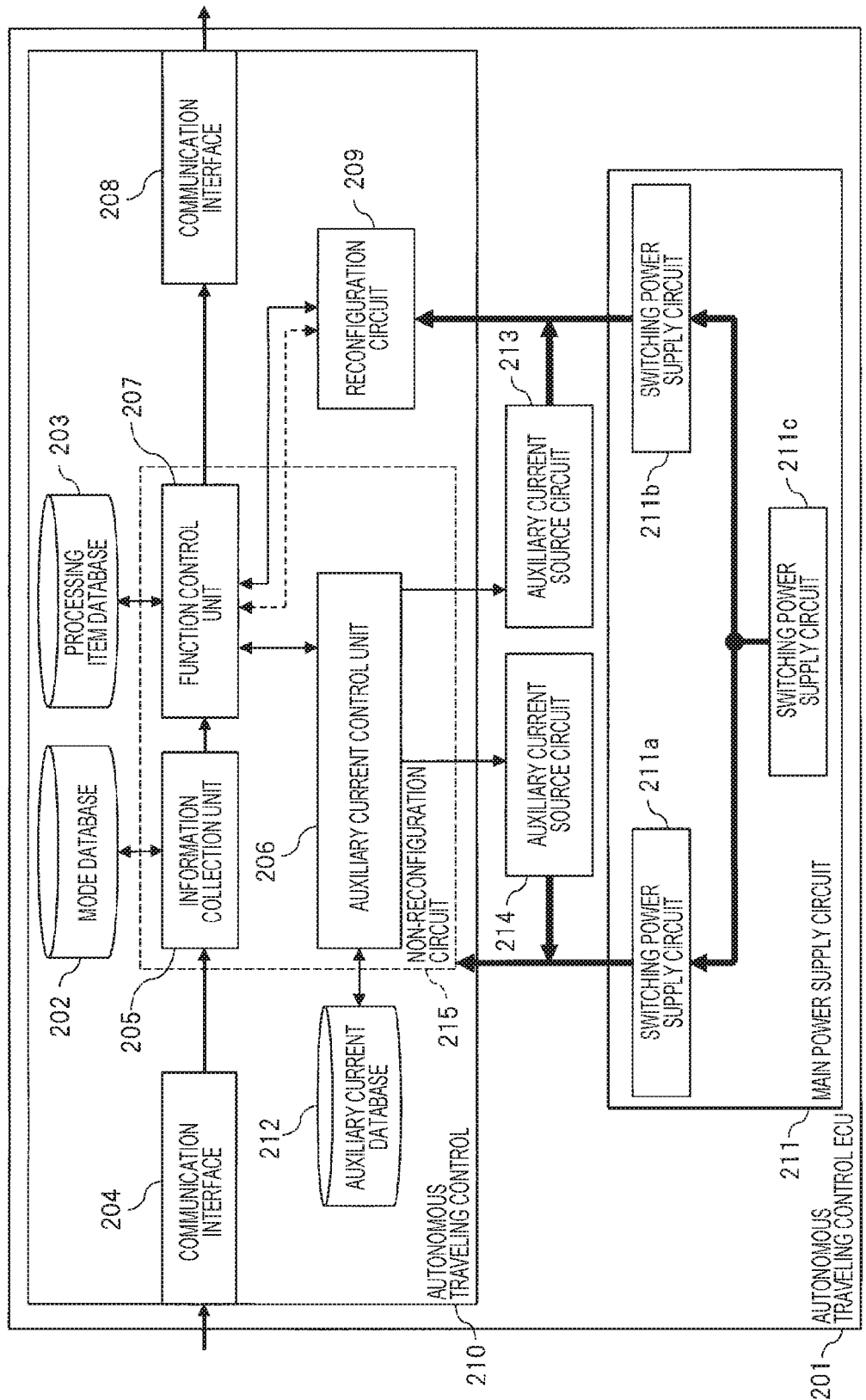
FIG. 14 is a diagram illustrating an example of an autonomous traveling control ECU according to a third embodiment.

FIG. 14 is a diagram illustrating an example of an autonomous traveling control ECU according to a third embodiment.

In the autonomous traveling control ECU 201 shown in FIG. 14, a difference from the autonomous traveling control ECU 201 described in FIG. 2 of the first embodiment will be mainly described.

The autonomous traveling control ECU 201 of FIG. 14 is different from the autonomous traveling control ECU 201 of FIG. 2 in a configuration of a main power supply circuit 211 and an auxiliary current source circuit 214 to be newly provided.

The main power supply circuit 211 supplies a power supply voltage to a non-reconfiguration circuit 215 and a reconfiguration circuit 209. The non-reconfiguration circuit 215 is configured to include an information collection unit 205, a function control unit 207, and an auxiliary current control unit 206. Since the information collection unit 205, the function control unit 207, and the auxiliary current control unit 206 are similar to those in FIG. 2, the description will be omitted.

The main power supply circuit 211 has switching power supply circuits 211a to 211c. The switching power supply circuit 211c converts a power supply voltage supplied from a battery of a vehicle not shown in the drawings into an intermediate voltage and supplies the voltage to the switching power supply circuit 211a and the switching power supply circuit 211b.

The switching power supply circuit 211a generates a desired power supply voltage from the power supply voltage supplied from the switching power supply circuit 211c and supplies it to the non-reconfiguration circuit 215. The switching power supply circuit 211b generates a desired power supply voltage from the power supply voltage supplied from the switching power supply circuit 211c and supplies it to the reconfiguration circuit 209.

Here, when a load current of the reconfiguration circuit 209 rapidly increases or decreases transiently, it is a power supply voltage to be output from the same switching power supply circuit 211c, so that inter-output interference in which an output voltage decreases or increases even in the switching power supply circuit 211a occurs. The auxiliary current source circuit 214 is provided to prevent the inter-output interference, and adds or reduces a shortage or surplus current. Since the auxiliary current source circuit 213 is similar to that in FIG. 2, the description will be omitted.

Figure 15:
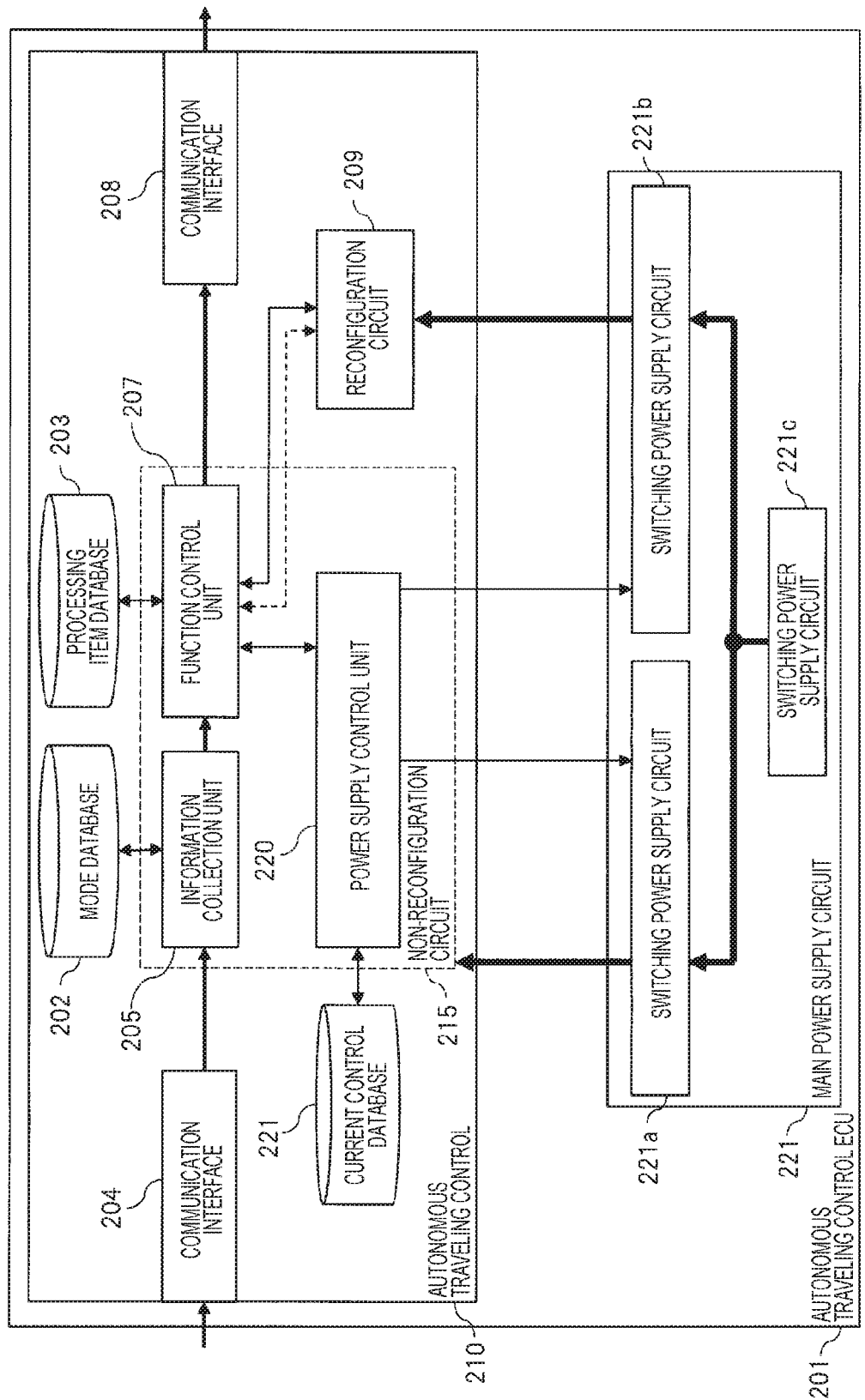
FIG. 15 is a diagram illustrating another configuration example of the autonomous traveling control ECU of FIG. 14.

FIG. 15 is a diagram illustrating another configuration example of the autonomous traveling control ECU of FIG. 14.

An autonomous traveling control ECU 201 of FIG. 15 is different from the autonomous traveling control ECU 201 of FIG. 14 in that auxiliary current source circuits 213 and 214 are removed, a power supply control unit 220 is newly provided instead of an auxiliary current control unit 206, and a power supply control database 221 is newly provided instead of an auxiliary current database 212.

In the power supply control database 221, information regarding a schedule of power supply control such as a control signal or timing for increasing or decreasing a current output from switching power supply circuits 211a and 211b is stored.

The power supply control unit 220 transmits the control signals to the switching power supply circuits 211a and 211b, on the basis of the information stored in the power supply control database 221, and increases or decreases the output currents of the switching power supply circuits 211a and 211b in accordance with the load current variation of the reconfiguration circuit 209 described above.

As described above, a variation in the power supply voltage supplied to other circuit such as the non-reconfiguration circuit 215 associated with the load current variation of the reconfiguration circuit 209 can be prevented. As a result, the electronic control device 201 with high reliability can be provided.

Although the invention made by the present inventors has been specifically described on the basis of the embodiments, it goes without saying that the present invention is not limited to the embodiments and various changes can be made without departing from the gist thereof.

The present invention is not limited to the embodiments described above and various modifications are included. For example, the embodiments are described in detail to facilitate the understanding of the present invention and are not limited to including all of the described configurations.

Further, a part of the configurations of the certain embodiment can be replaced by the configurations of other embodiments or the configurations of other embodiments can be added to the configurations of the certain embodiment. Further, for a part of the configurations of the individual embodiments, addition of other configurations, configuration removal, and configuration replacement can be performed.

Further, a part or all of the individual configurations, functions, processing units, and processing mechanisms may be realized by hardware by designing with integrated circuits, for example. Further, the individual configurations and functions may be realized by software by analyzing and executing programs for realizing the functions by a processor. Information such as the programs, the tables, and the files for realizing the individual functions may be stored in a recording device such as a memory, a hard disk, and a solid state drive (SSD) or a recording medium such as an IC card, an SD card, and a DVD.

Further, only control lines or information lines necessary for explanation are shown and the control lines or information lines do not mean all control lines or information lines necessary for a product. In actuality, almost all configurations may be mutually connected.

REFERENCE SIGNS LIST 10 in-vehicle system
101 camera
102 radar
103 own vehicle position sensor
104 automatic driving button
105 wireless communication device
106 auxiliary control ECU
107 brake control ECU
108 engine control ECU
109 power steering control ECU
201 autonomous traveling control ECU
202 mode database
203 processing item database
204 communication interface
205 information collection unit
206 auxiliary current control unit
207 function control unit
208 communication interface
209 reconfiguration circuit
210 autonomous traveling control logic unit
211 main power supply circuit
211a to 211c switching power supply circuit
212 auxiliary current database
213 auxiliary current source circuit
214 auxiliary current source circuit
215 non-reconfiguration circuit
220 power supply control unit
221 power supply control database
251 power supply unit
263 A/D converter
264 current excess/deficiency operation unit
265 inductor
267 switch
269 switch driver
270 PWM generator
272 error detector
274 inductor current control unit
277 current sensor
280 switch
281 resistor
282 resistor
283 switch
290 capacitor

The invention claimed is:
1. An electronic control device, comprising:
a reconfiguration circuit which is a reconfigurable logic circuit;
a main power supply circuit which supplies a power supply voltage to the reconfiguration circuit;

an auxiliary current source circuit which controls a current supplied from the main power supply circuit to the reconfiguration circuit;
a function control unit which determines an operation mode of the reconfiguration circuit, on the basis of a mode determination signal input from the outside and indicating a traveling mode of a vehicle, and controls a reconfiguration of the reconfiguration circuit on the basis of a determination result, wherein
the auxiliary current source circuit increases or decreases the current supplied to the reconfiguration circuit in accordance with a load variation of the reconfiguration circuit, on the basis of an auxiliary current control signal for giving an instruction on an increase or decrease of the current supplied to the reconfiguration circuit;
an auxiliary current database which stores the operation mode of the reconfiguration circuit and control information of the auxiliary current source circuit corresponding to the operation mode; and
an auxiliary current control unit which acquires the control information corresponding to the operation mode from the auxiliary current database, on the basis of the operation mode determined by the function control unit, and generates the auxiliary current control signal for giving an instruction on the increase or decrease of the current supplied to the reconfiguration circuit from the acquired control information.

2. The electronic control device according to claim 1, wherein
the main power supply circuit supplies the power supply voltage to other logic circuits other than the reconfiguration circuit included in the electronic control device.

3. The electronic control device according to claim 1, further comprising:
a current excess/deficiency operation unit which operates excess or deficiency of the current supplied from the main power supply circuit to the reconfiguration circuit, wherein
the auxiliary current source circuit updates the control information stored in the auxiliary current database, according to an operation result of the current excess/deficiency operation unit.

4. The electronic control device according to claim 3, further comprising:
a voltage observation unit which detects the power supply voltage input to the reconfiguration circuit, wherein
the auxiliary current source circuit operates the excess or deficiency of the current supplied to the reconfiguration circuit, by the power supply voltage detected by the voltage observation unit.

5. The electronic control device according to claim 1, wherein
the auxiliary current source circuit has
a plurality of first auxiliary current circuits which increase the current supplied from the main power supply circuit to the reconfiguration circuit, and
a plurality of second auxiliary current circuits which decrease the current supplied from the main power supply circuit to the reconfiguration circuit,
the first auxiliary current circuit has
a first switch in which an input voltage input to the main power supply circuit is input to one connection unit, and
a first resistor in which the other connection unit of the first switch is connected to one connection unit and a power supply voltage input unit of the reconfiguration circuit to which the power supply voltage generated by the main power supply circuit is supplied is connected to the other connection unit,
the second auxiliary current circuit has
a second switch in which a reference potential is connected to one connection unit, and
a second resistor in which the other connection unit of the second switch is connected to one connection unit and the power supply voltage input unit of the reconfiguration circuit is connected to the other connection unit, and
an ON/OFF operation of each of the first switch and the second switch is controlled by the auxiliary current control signal output from the auxiliary current control unit.

6. The electronic control device according to claim 1, further comprising:
a communication device which is connected to a communication network, wherein
the auxiliary current control unit updates the control information stored in the auxiliary current database, on the basis of update information collected from the communication network through the communication device.

7. An in-vehicle system having an autonomous traveling control device for controlling autonomous traveling of a vehicle, wherein
the autonomous traveling control device has
a reconfiguration circuit which is a reconfigurable logic circuit,
a main power supply circuit which supplies a power supply voltage to the reconfiguration circuit,
an auxiliary current source circuit which increases or decreases a current supplied from the main power supply circuit to the reconfiguration circuit, and
a function control unit which determines an operation mode of the reconfiguration circuit, on the basis of a mode determination signal input from the outside and indicating a traveling mode of a vehicle, and controls a reconfiguration of the reconfiguration circuit on the basis of a determination result, and
the auxiliary current source circuit increases or decreases the current supplied to the reconfiguration circuit in accordance with a load variation of the reconfiguration circuit, on the basis of an auxiliary current control signal for giving an instruction on an increase or decrease of the current supplied to the reconfiguration circuit, wherein
the autonomous traveling control device has
an auxiliary current database which stores the operation mode of the reconfiguration circuit and control information of the auxiliary current source circuit corresponding to the operation mode, and
an auxiliary current control unit which acquires the control information corresponding to the operation mode from the auxiliary current database, on the basis of the operation mode determined by the function control unit, and generates the auxiliary current control signal for giving an instruction on the increase or decrease of the current supplied to the reconfiguration circuit from the acquired control information.

8. The in-vehicle system according to claim 7, wherein
the autonomous traveling control device has a current excess/deficiency operation unit which operates excess or deficiency of the current supplied from the main power supply circuit to the reconfiguration circuit, and the auxiliary current source circuit updates the control information stored in the auxiliary current database, according to an operation result of the current excess/deficiency operation unit.

9. The in-vehicle system according to claim 8, wherein
the autonomous traveling control device has a voltage observation unit which detects the power supply voltage input to the reconfiguration circuit, and
the auxiliary current source circuit operates the excess or deficiency of the current supplied to the reconfiguration circuit, by the power supply voltage detected by the voltage observation unit.

10. The in-vehicle system according to claim 9, further comprising:
a communication device which is connected to a communication network, wherein
the auxiliary current control unit updates the control information stored in the auxiliary current database, on the basis of update information collected from the communication network through the communication device.

11. A power supply device, comprising:
a main power supply circuit which supplies a power supply voltage to a reconfiguration circuit which is a reconfigurable logic circuit;
an auxiliary current source circuit which increases or decreases a current supplied from the main power supply circuit to the reconfiguration circuit, wherein
the auxiliary current source circuit increases or decreases the current supplied to the reconfiguration circuit in accordance with a load variation of the reconfiguration circuit, on the basis of an auxiliary current control signal for giving an instruction on an increase or decrease of the current supplied to the reconfiguration circuit;
an auxiliary current database which stores an operation mode of the reconfiguration circuit and control information of the auxiliary current source circuit corresponding to the operation mode; and
an auxiliary current control unit which acquires the control information corresponding to the determined operation mode from the auxiliary current database, on the basis of a determination result of the operation mode of the reconfiguration circuit input from the outside, and generates the auxiliary current control signal for giving an instruction on the increase or decrease of the current supplied to the reconfiguration circuit from the acquired control information.

12. The power supply device according to claim 11, wherein
the auxiliary current source circuit has
a plurality of first auxiliary current circuits which increase the current supplied from the main power supply circuit to the reconfiguration circuit, and
a plurality of second auxiliary current circuits which decrease the current supplied from the main power supply circuit to the reconfiguration circuit,
the first auxiliary current circuit has
a first switch in which an input voltage input to the main power supply circuit is input to one connection unit, and
a first resistor in which the other connection unit of the first switch is connected to one connection unit and a power supply voltage input unit of the reconfiguration circuit to which the power supply voltage generated by the main power supply circuit is supplied is connected to the other connection unit,
the second auxiliary current circuit has
a second switch in which a reference potential is connected to one connection unit, and
a second resistor in which the other connection unit of the second switch is connected to one connection unit and the power supply voltage input unit of the reconfiguration circuit is connected to the other connection unit, and
an ON/OFF operation of each of the first switch and the second switch is controlled by the auxiliary current control signal output from the auxiliary current control unit.

* * * * *